(12) United States Patent
Goffe

(10) Patent No.: US 11,007,514 B2
(45) Date of Patent: May 18, 2021

(54) AMMONIA FACILITATED CATION LOADING OF ZEOLITE CATALYSTS

(71) Applicant: PACCAR Inc., Bellevue, WA (US)

(72) Inventor: Randal A. Goffe, Everett, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 16/376,980

(22) Filed: Apr. 5, 2019

(65) Prior Publication Data

US 2020/0316573 A1    Oct. 8, 2020

(51) Int. Cl.
  *B01J 29/06*    (2006.01)
  *B01J 29/76*    (2006.01)
  (Continued)

(52) U.S. Cl.
  CPC .......... *B01J 29/763* (2013.01); *B01J 29/061* (2013.01); *B01J 29/405* (2013.01); *B01J 29/44* (2013.01);
  (Continued)

(58) Field of Classification Search
  CPC . B01J 29/061; B01J 29/44; B01J 29/46; B01J 29/48; B01J 29/405; B01J 29/85; B01J 29/7007; B01J 29/7057; B01J 29/7065; B01J 29/7015; B01J 29/7815; B01J 29/7415; B01J 29/7615; B01J 29/723; B01J 29/743; B01J 29/763; B01J 29/783; B01J 2229/183; B01J 35/04; B01J 35/0006; B01J 35/026; B01J 35/023; B01J 35/0073; B01J 37/30; B01J 37/035; B01J 37/0201; B01J 37/0209; B01J 37/0213; B01J 37/08; B01D 53/9418; B01D 2255/40; B01D 2255/50; B01D 2255/502;
  (Continued)

(56) References Cited

U.S. PATENT DOCUMENTS

| 858,904 A | 7/1907 | Ostwald |
| 3,730,691 A | 5/1973 | Lang et al. |

(Continued)

FOREIGN PATENT DOCUMENTS

| CN | 103866343 B | 6/2014 |
| CN | 105363497 A | 3/2016 |

(Continued)

OTHER PUBLICATIONS

Schwan et al., "Solid-State Ion-Exchange of Copper into Zeolites Facilitated by Ammonia at Low Temperature", ACS Catal., 5, pp. 16-19, 2015.*

(Continued)

*Primary Examiner* — Elizabeth D Wood
(74) *Attorney, Agent, or Firm* — Seed IP Law Group LLP

(57) ABSTRACT

The present disclosure features a high metal cation content zeolite-based binary catalyst (e.g., a high copper and/or iron content zeolite-based binary catalyst, where the zeolite can be a chabazite) for $NO_x$ reduction, having relatively low $N_2O$ make, and having low corresponding metal oxide content; where the metal in the metal oxide corresponds to the metal of the metal cation. The present disclosure also describes the synthesis of the zeolite-based binary catalyst having high metal cation content.

13 Claims, 6 Drawing Sheets

(51) Int. Cl.

| | | |
|---|---|---|
| B01J 37/00 | (2006.01) | |
| B01J 29/46 | (2006.01) | |
| F01N 3/20 | (2006.01) | |
| B01J 29/85 | (2006.01) | |
| B01J 29/70 | (2006.01) | |
| B01J 29/44 | (2006.01) | |
| B01J 29/48 | (2006.01) | |
| B01J 29/40 | (2006.01) | |
| B01J 29/78 | (2006.01) | |
| B01J 29/74 | (2006.01) | |
| B01J 29/72 | (2006.01) | |
| B01J 35/04 | (2006.01) | |
| B01J 35/02 | (2006.01) | |
| B01J 37/03 | (2006.01) | |
| B01J 37/30 | (2006.01) | |
| B01J 37/02 | (2006.01) | |
| B01J 35/00 | (2006.01) | |
| C01B 39/40 | (2006.01) | |
| B01J 37/08 | (2006.01) | |
| C01B 39/04 | (2006.01) | |
| C01B 39/02 | (2006.01) | |
| C01B 39/06 | (2006.01) | |
| B01D 53/94 | (2006.01) | |

(52) U.S. Cl.
CPC ............... *B01J 29/46* (2013.01); *B01J 29/48* (2013.01); *B01J 29/7007* (2013.01); *B01J 29/7015* (2013.01); *B01J 29/7057* (2013.01); *B01J 29/7065* (2013.01); *B01J 29/723* (2013.01); *B01J 29/743* (2013.01); *B01J 29/7415* (2013.01); *B01J 29/7615* (2013.01); *B01J 29/783* (2013.01); *B01J 29/7815* (2013.01); *B01J 29/85* (2013.01); *B01J 35/0006* (2013.01); *B01J 35/0073* (2013.01); *B01J 35/023* (2013.01); *B01J 35/026* (2013.01); *B01J 35/04* (2013.01); *B01J 37/009* (2013.01); *B01J 37/0201* (2013.01); *B01J 37/0209* (2013.01); *B01J 37/0213* (2013.01); *B01J 37/035* (2013.01); *B01J 37/08* (2013.01); *B01J 37/30* (2013.01); *C01B 39/02* (2013.01); *C01B 39/04* (2013.01); *C01B 39/06* (2013.01); *C01B 39/40* (2013.01); *F01N 3/2066* (2013.01); *B01D 53/9418* (2013.01); *B01D 2255/40* (2013.01); *B01D 2255/50* (2013.01); *B01D 2255/502* (2013.01); *B01D 2257/404* (2013.01); *B01D 2258/012* (2013.01); *B01J 2229/183* (2013.01); *B01J 2229/186* (2013.01); *B01J 2229/42* (2013.01); *F01N 2370/04* (2013.01); *F01N 2510/068* (2013.01)

(58) Field of Classification Search
CPC ........ B01D 2255/504; B01D 2257/404; B01D 2258/012; Y02T 10/24; C01B 39/04; C01B 39/06; C01B 39/02; C01B 39/40; C01B 39/065; F01N 2370/04; F01N 3/2803; F01N 3/2066
USPC ........ 502/60, 61, 63, 64, 65, 66, 69, 73, 74, 502/77, 85; 423/702, 704, 705, 706, 713
See application file for complete search history.

(56) References Cited

U.S. PATENT DOCUMENTS

| | | |
|---|---|---|
| 4,711,871 A | 12/1987 | Wachs et al. |
| 4,929,581 A | 5/1990 | Steinwandel et al. |
| 4,983,274 A | 1/1991 | Chen et al. |
| 5,149,512 A | 9/1992 | Li et al. |
| 6,407,032 B1 | 6/2002 | Labarge et al. |
| 6,475,944 B1 | 11/2002 | Yang et al. |
| 6,826,906 B2 | 12/2004 | Kakwani et al. |
| 7,078,004 B2 | 7/2006 | Voss et al. |
| 7,229,597 B2 | 6/2007 | Patchett et al. |
| 7,509,799 B2 | 3/2009 | Amou et al. |
| 7,632,775 B2 | 12/2009 | Zhou et al. |
| 7,902,107 B2 | 3/2011 | Patchett et al. |
| 7,998,423 B2 | 8/2011 | Boorse et al. |
| 8,017,097 B1 | 9/2011 | Southward et al. |
| 8,017,543 B2 | 9/2011 | Andy et al. |
| 8,119,088 B2 | 2/2012 | Boorse et al. |
| 8,359,832 B2 | 1/2013 | Yi et al. |
| 8,388,920 B2 | 3/2013 | Botte |
| 8,501,132 B2 | 8/2013 | Fu et al. |
| 8,568,675 B2 | 10/2013 | Deeba et al. |
| 8,667,785 B2 | 3/2014 | Blakeman et al. |
| 8,679,434 B1 | 3/2014 | Li et al. |
| 8,748,333 B2 | 6/2014 | Nemeth et al. |
| 8,828,900 B2 | 9/2014 | Takagi et al. |
| 8,989,637 B2 | 3/2015 | Yoshii |
| 9,005,559 B2 | 4/2015 | Sumiya et al. |
| 9,034,269 B2 | 5/2015 | Hilgendorff et al. |
| 9,186,654 B2 | 11/2015 | Qi et al. |
| 9,737,877 B2 | 8/2017 | Goffe |
| 9,757,691 B2 | 9/2017 | Goffe |
| 9,764,287 B2 | 9/2017 | Goffe |
| 10,188,986 B2 | 1/2019 | Goffe |
| 2002/0049137 A1 | 4/2002 | Morikawa et al. |
| 2002/0054844 A1 | 5/2002 | Pfeifer et al. |
| 2002/0132724 A1 | 9/2002 | Labarge et al. |
| 2004/0206069 A1 | 10/2004 | Tumati et al. |
| 2005/0013756 A1 | 1/2005 | Amou et al. |
| 2006/0049063 A1 | 3/2006 | Murphy et al. |
| 2006/0057046 A1 | 3/2006 | Punke et al. |
| 2006/0257303 A1 | 11/2006 | Telford |
| 2008/0314027 A1 | 12/2008 | Barber et al. |
| 2009/0173063 A1 | 7/2009 | Boorse et al. |
| 2009/0205324 A1 | 8/2009 | Girard et al. |
| 2009/0214397 A1 | 8/2009 | Shirono et al. |
| 2010/0139152 A1 | 6/2010 | Hucul et al. |
| 2010/0146948 A1 | 6/2010 | DaCosta et al. |
| 2010/0146950 A1 | 6/2010 | Hayashi et al. |
| 2010/0172828 A1 | 7/2010 | Althoff et al. |
| 2010/0180580 A1 | 7/2010 | Boorse et al. |
| 2010/0247407 A1 | 9/2010 | Larcher et al. |
| 2011/0030346 A1 | 2/2011 | Neubauer et al. |
| 2011/0142737 A1 | 6/2011 | Seyler et al. |
| 2011/0155643 A1 | 6/2011 | Tov et al. |
| 2011/0250114 A1 | 10/2011 | Augustine et al. |
| 2011/0293941 A1 | 12/2011 | Chaumonnot et al. |
| 2011/0302909 A1 | 12/2011 | Botte |
| 2012/0058034 A1 | 3/2012 | Ogunwumi et al. |
| 2012/0121486 A1 | 5/2012 | Collier et al. |
| 2012/0175247 A1 | 7/2012 | Darrel |
| 2012/0230881 A1 | 9/2012 | Boger et al. |
| 2012/0247092 A1 | 10/2012 | Boorse |
| 2013/0102819 A1 | 4/2013 | Szesni et al. |
| 2013/0121902 A1 | 5/2013 | Adelmann et al. |
| 2013/0158138 A1 | 6/2013 | Jothimurugesan et al. |
| 2013/0336865 A1 | 12/2013 | Brisley et al. |
| 2014/0041366 A1 | 2/2014 | Seyler et al. |
| 2014/0044627 A1 | 2/2014 | Siani et al. |
| 2014/0061099 A1 | 3/2014 | Hussain et al. |
| 2014/0127100 A1 | 5/2014 | Gerhart et al. |
| 2014/0140909 A1 | 5/2014 | Qi et al. |
| 2014/0141963 A1 | 5/2014 | Jones et al. |
| 2014/0193746 A1 | 7/2014 | Cerri et al. |
| 2014/0227155 A1 | 8/2014 | Phillips et al. |
| 2014/0234190 A1 | 8/2014 | McKenna |
| 2015/0000737 A1 | 1/2015 | Miyake et al. |
| 2015/0017075 A1 | 1/2015 | Jinbo et al. |
| 2015/0017083 A1 | 1/2015 | Maunula |
| 2015/0037233 A1 | 2/2015 | Fedeyko et al. |
| 2015/0060472 A1 | 3/2015 | Most et al. |
| 2015/0114882 A1 | 4/2015 | Nagayasu et al. |
| 2015/0209766 A1 | 7/2015 | Xavier et al. |

(56) References Cited

U.S. PATENT DOCUMENTS

| | | |
|---|---|---|
| 2015/0360212 A1 | 12/2015 | Chandler et al. |
| 2016/0040576 A1 | 2/2016 | Chandler et al. |
| 2016/0045868 A1 | 2/2016 | Sonntag et al. |
| 2016/0074809 A1 | 3/2016 | Goffe |
| 2016/0074839 A1 | 3/2016 | Goffe |
| 2016/0076425 A1 | 3/2016 | Goffe |
| 2016/0136617 A1 | 5/2016 | Nazarpoor et al. |
| 2016/0214086 A1 | 7/2016 | Ano et al. |
| 2016/0303555 A1 | 10/2016 | Park et al. |
| 2016/0339389 A1 | 11/2016 | Hoke et al. |
| 2016/0346765 A1 | 12/2016 | Nazarpoor et al. |
| 2017/0128881 A1 | 5/2017 | Goffe |
| 2017/0128882 A1 | 5/2017 | Goffe |
| 2017/0128883 A1 | 5/2017 | Goffe |
| 2017/0128884 A1 | 5/2017 | Goffe |
| 2017/0128885 A1 | 5/2017 | Goffe |
| 2017/0128913 A1 | 5/2017 | Goffe |
| 2017/0284257 A1 | 10/2017 | Omiya et al. |
| 2017/0320014 A1 | 11/2017 | Hanson |
| 2018/0345217 A1 | 12/2018 | Goffe |

FOREIGN PATENT DOCUMENTS

| | | |
|---|---|---|
| CZ | 293 108 B6 | 2/2004 |
| DE | 4203807 A1 | 8/1993 |
| EP | 1945356 B1 | 9/2012 |
| EP | 3370866 A1 | 9/2018 |
| GB | 2504024 A | 1/2014 |
| GB | 2504024 B | 3/2014 |
| WO | 2004/022229 A1 | 3/2004 |
| WO | 2008/094889 A1 | 8/2008 |
| WO | 2009/050323 A1 | 4/2009 |
| WO | 2009/118195 A1 | 10/2009 |
| WO | 2012/059144 A1 | 5/2012 |
| WO | 2013/121112 A1 | 8/2013 |
| WO | 2014/027207 A1 | 2/2014 |
| WO | 2015/060472 A1 | 4/2015 |
| WO | 2017/079598 A1 | 5/2017 |
| WO | 2017/085646 A1 | 5/2017 |

OTHER PUBLICATIONS

Canadian Office Action dated Aug. 8, 2019, issue from corresponding Canadian Application No. 3,004,079, filed Nov. 4, 2016, 3 pages.

Bernhard, A.M., et al., "Catalytic Urea Hydrolysis in the Selective Catalytic Reduction of NOx: Catalyst Screening and Kinetics on Anatase TiO2 and ZrO2," Journal of Catalysis Science and Technology, 4(3):942, 2013.

Birkhold, F., et al., "Modeling and Simulation of the Injection of Urea-Water-Solution for Automotive SCR DeNOx-Systems," Applied Catalysis B: Environmental 70(1-4):119-127, Jan. 2007.

Calvo Zueco, S., et al., "Urea SCR Systems in Focus New Challenges in the Development of Exhaust Systems," Springer Link [Online], Sep. 2007, <https://static-content.springer.com/lookinside/art%3A10.1007%2FBF03226854/001.png> [retrieved Feb. 17, 2016], 3 pages.

Conway, R., et al., "Demonstration of SCR on a Diesel Particulate Filter System on a Heavy Duty Application," SAE Technical Paper 2015-01-1033, Apr. 14, 2015, Abstract.

Devarakonda, M.N., et al., "Technical Challenges in the Integration of DPF and SCR Aftertreatment—Review From a Systems and Modeling Perspective," 12th DOE Cross-Cut Workshop on Lean Exhaust Emissions Reduction Simulations [CLEERS], Apr. 28-30, 2009, Dearborn, Mich., Abstract, 1 page.

Devarakonda, M.N., et al., "Technical Challenges in the Integration of DPF and SCR Aftertreatment on a Single Substrate—Review From a Systems and Modeling Perspective," presented by Maruthi N. Devarakonda at 12th DOE Cross-Cut Workshop on Lean Exhaust Emissions Reduction Simulations [CLEERS], Apr. 28-30, 2009, Dearborn, Mich., Apr. 29, 2009, 22 pages.

Dong, H., et al., "Effect of Urea Thermal Decomposition on Diesel NOx-SCR Aftertreatment Systems," SAE Technical Paper 2008-01-1544, Abstract.

"Engine Aftertreatment Systems: Operator's Manual," No. Y53-1090C, PACCAR Inc, Bellevue, Washington, 2011, 44 pages.

European Search Report dated Jul. 11, 2016, issued in related European Application No. 15184785, filed Sep. 11, 2015, 11 pages.

Extended European Search Report, dated Feb. 4, 2019, mailed in corresponding European Application No. 18175406.0, filed May 31, 2018, 12 pages.

Extended European Search Report, dated Oct. 15, 2018, mailed in corresponding European Application No. 18175456.5, filed Jun. 4, 2018, 9 pages.

Final Office Action dated Oct. 11, 2016, from U.S. Appl. No. 14/486,858, filed Sep. 15, 2014, 15 pages.

Geisselmann, A., "Future Aftertreatment Concepts for Heavy Duty Application," Abstract in SAE 2014 Heavy Duty Diesel Emissions Control Symposium, Event Guide, Gothenburg, Sweden, Sep. 17-18, 2014, p. 25.

Goffe, R.A., and D.M. Mason, "Electrocatalytic Oxidation of Hydrocarbons on a Stabilized-Zirconia Electrolyte Employing Gold or Platinum Electrodes," Journal of Applied Electrochemistry 11(4):447-452, Jul. 1981.

International Search Report and Written Opinion dated Mar. 30, 2017, received for International Application No. PCT/US2016/060583, filed Nov. 4, 2016, 7 pages.

Johannessen, T., "3rd Generation SCR System Using Solid Ammonia Storage and Direct Gas Dosing: Expanding the SCR window for RDE," presented by Dr. Tue Johannessen at US DoE DEER conference, 2012, 23 pages.

Koebel, M., and E.A. Strutz, "Thermal and Hydrolytic Decomposition of Urea for Automotive Selective Catalytic Reduction Systems: Thermochemical and Practical Aspects," Journal of Industrial and Engineering Chemistry 42:2093-2100, 2003.

Köster, K., et al., "Regeneration of Hemotiltrate by Anodic Oxidation of Urea," Artificial Organs 7(2):163-168, May 1983.

Krocher, "Chapter 9: Aspects of Catalyst Development for Mobile Urea—SCR Systems—From Vanadia-Titania Catalysts to Metal-Exchanged Zeolites," in P. Granger and V.I. Parvulescu (ed.), Elsevier B.V., 2007, pp. 261-289.

Kwak, J.H., et al., "Effects of Hydrothermal Aging on $NH_3$—SCR Reaction Over Cu/Zeolites," Journal of Catalysis 287(1):203-209, Mar. 2012.

Kwak, J.H., et al., "Excellent Activity and Selectivity of Cu-SSZ-13 in the Selective Catalytic Reduction of NO(x) and $NH_3$," Journal of Catalysis 275(2):187-190, Oct. 2010.

Neylon et al., "Bifunctional Catalysts for the Selective Catalytic Reduction of NO by Hydrocarbons," Proceedings of 9th Diesel Emissions Reduction Conference, Newport, R.I., Aug. 24-28, 2003, 5 pages.

Non-Final Office Action dated Jan. 19, 2017, from U.S. Appl. No. 14/935,199, filed Nov. 6, 2015, 8 pages.

Non-Final Office Action dated Jan. 23, 2017, from U.S. Appl. No. 14/935,048, filed Nov. 6, 2015, 17 pages.

Non-Final Office Action, dated Sep. 19, 2018 in related U.S. Appl. No. 15/612,833, filed Jun. 2, 2017, 25 pages.

Office Action dated Dec. 1, 2016, from related U.S. Appl. No. 14/934,955, filed Nov. 6, 2015, 20 pages.

Office Action dated Dec. 1, 2016, from U.S. Appl. No. 14/934,955, filed Nov. 6, 2015, 27 pages.

Office Action dated Dec. 12, 2016, from related U.S. Appl. No. 14/935,001, filed Nov. 6, 2015, 7 pages.

Office Action dated Dec. 12, 2016, from U.S. Appl. No. 14/935,001, filed Nov. 6, 2015, 15 pages.

Office Action dated Jan. 19, 2017, from related U.S. Appl. No. 14/935,199, filed Nov. 6, 2015, 19 pages.

Office Action dated Jan. 19, 2017, from U.S. Appl. No. 14/935,199, filed Nov. 6, 2015, 8 pages.

Office Action dated Jan. 23, 2017, from related U.S. Appl. No. 14/935,048, filed Nov. 6, 2015, 9 pages.

Office Action dated Jan. 23, 2017, from related U.S. Appl. No. 14/935,048, filed Nov. 6, 2015, 20 pages.

(56) References Cited

OTHER PUBLICATIONS

Office Action dated May 31, 2016, from U.S. Appl. No. 14/486,858, filed Sep. 15, 2014, 17 pages.
Partial European Search Report dated Mar. 16, 2016, issued in corresponding European Application No. 15184785.2, filed Sep. 11, 2015, 6 pages.
Partial European Search Report, dated Oct. 15, 2018, mailed in corresponding European Application No. 18175406.0, filed May 31, 2018, 14 pages.
Patzer II, J.F., et al., "Urea Oxidation Kinetics via Cyclic Voltammetry: Application to Regenerative Hemodialysis," Bioelectrochemistry and Bioenergetics 276(3):341-353, Dec. 1989.
Patzer II, J.F., et al., "Voltage Polarity Relay—Optimal Control of Electrochemical Urea Oxidation," IEEE Transactions on Biomedical Engineering 38(11):1157-1162, Nov. 1991.
Piazzesi et al., "Isocyanic Acid Hydrolysis Over Fe-ZSM5 in Urea-SCR," Catalysis Communications 7(8):600-603, Aug. 2006.
Rappé, K.G., "Combination and Integration of DPF-SCR Aftertreatment Technologies," presented by Kenneth G. Rappé at Annual Merit Review and Peer Evaluation, May 16, 2012, 24 pages.
Rappé, K.G., and G.D. Maupin, "III.6 Integration of DPF & SCR Technologies for Combined Soot and NO(x) After-Treatment," Advanced Combustion Engine R&D, FY 2014 Annual Report, Pacific Northwest National Laboratory, Richland, Wash., pp. III-30-III-33.
Rappé, K.G., et al., "Combination & Integration of DPF-SCR Aftertreatment," presented by Kenneth G. Rappé at Directions in Engine-Efficiency and Emissions Research Conference [DEER 2011], Detroit, Mich., Oct. 5, 2011, 18 pages.
Rappé, K.G., et al., "Combination & Integration of DPF-SCR Aftertreatment," presented by Kenneth G. Rappé at Directions in Engine-Efficiency and Emissions Research Conference [DEER 2012], Dearborn, Mich., Oct. 18, 2012, 34 pages.
Rappé, K.G., et al., "Combination and Integration of DPF-SCR Aftertreatment Technologies," presented by Darrell R. Herling at the DOE Annual Merit Review and Peer Evaluation, Arlington, Va., May 11, 2011, 24 pages.
Rappé, K.G., et al., "Combination and Integration of DPF-SCR Aftertreatment Technologies," presented by Darrell R. Herling at the DOE Annual Merit Review and Peer Evaluation, Washington, D.C., Jun. 9, 2010, 16 pages.
Rappé, K.G., et al., "II.B.12 Combination and Integration of DPF-SCR After-Treatment," Advanced Combustion Engine R&D, FY 2011 Annual Report, Pacific Northwest National Laboratory, Richland, Washington, pp. 227-230.
Restriction Requirement dated Jan. 7, 2016, from U.S. Appl. No. 14/486,858, filed Sep. 15, 2014, 9 pages.
Shoeib, M., et al., "Electroless Nickel Coatings on Glass Substrate: Physical and Electrochemical Properties," <https://www.steel-grips.com/articles/2013/sg13002.pdf>, 4 pages.
Storey, J.M.E., et al., "Characterization of Urea Decomposition Products in Selective Catalytic Reduction Catalyst Systems," Abstracts of Papers of the American Chemical Society, Washington, D.C., 2011, vol. 242, 2 pages.
Yao, S.J., et al., "Anodic Oxidation of Urea and an Electrochemical Approach to De-ureation," Nature 241(5390):471-472, Feb. 1973.
Ye, Q., et al., "Activity, Propene Poisoning Resistance and Hydrothermal Stability of Copper Exchanged Chabazite-Like Zeolite Catalysts for SCR of NO With Ammonia in Comparison to Cu/ZSM-5," Applied Catalysis A: General 427-428:24-34, Jun. 2012.
Yim et al., "Decomposition of Urea into NH3 for the SCR Process," Ind. Eng. Chem. Res. 2004, 43, 4856-4863.
Extended European Search Report, dated Jun. 18, 2019, mailed in corresponding EP Application No. 16863064.8, filed Nov. 4, 2016, 8 pages.
Borodianska, H., et al., "Nanoblast Synthesis and SPS of Nanostructured Oxides for SOFC," Journal of Electroceramics, 22(1-3):47-54, Dec. 2007.
Communication Pursuant to Article 94(3) EPC, issued in corresponding European Application No. 15184785.2, filed Sep. 11, 2015, 6 pages.
Carvahlo et al., "Design of nanocomposites with cobalt encapsulated in the zeolite micropores for selective synthesis of isoparaffins in Fischer-Tropsch reaction," *Catal. Sci. Technol.* 2017(7), Sep. 2017, pp. 5019-5027. (9 pages).
Chu et al., "Isomorphous Substitution in Zeolite Frameworks. 1. Acidity of Surface Hydroxis in [B]-, [Fe]-, [Ga]-, and [Al]-ZSM-5," *J.Phys. Chem* 1985(89), Dec. 1984, pp. 1569-1571. (3 pages).
Luo et al., "Facile synthesis of zeolite-encapsulated iron oxide nanoparticles as superior catalysts for phenol oxidation," *RSC Adv.* 2015(5), Feb. 2015, pp. 29509-29512. (4 pages).
Otto et al., "Synthetic strategies for the encapsulation of nanoparticles of Ni, Co, and Fe oxides within crystalline microporous aluminosilicates," *Microporous and Mesoporous Materials* 279(2018), Apr. 2018, pp. 10-23. (14 pages).
Xu et al., "Encapsulation of Metal Nanoparticle Catalysts Within Mesoporous Zeolites and Their Enhanced Catalytic Performances: A Review," *Front Chem.* 6(550), Nov. 2018, 54 pages.

* cited by examiner

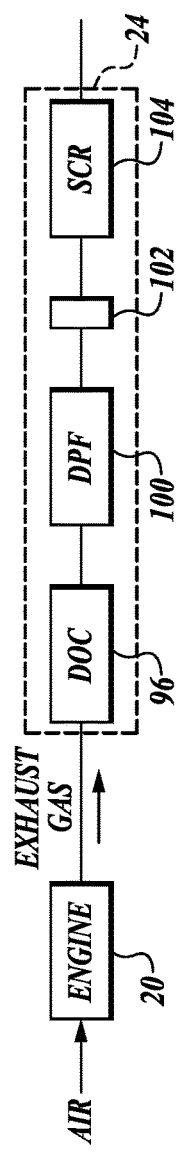
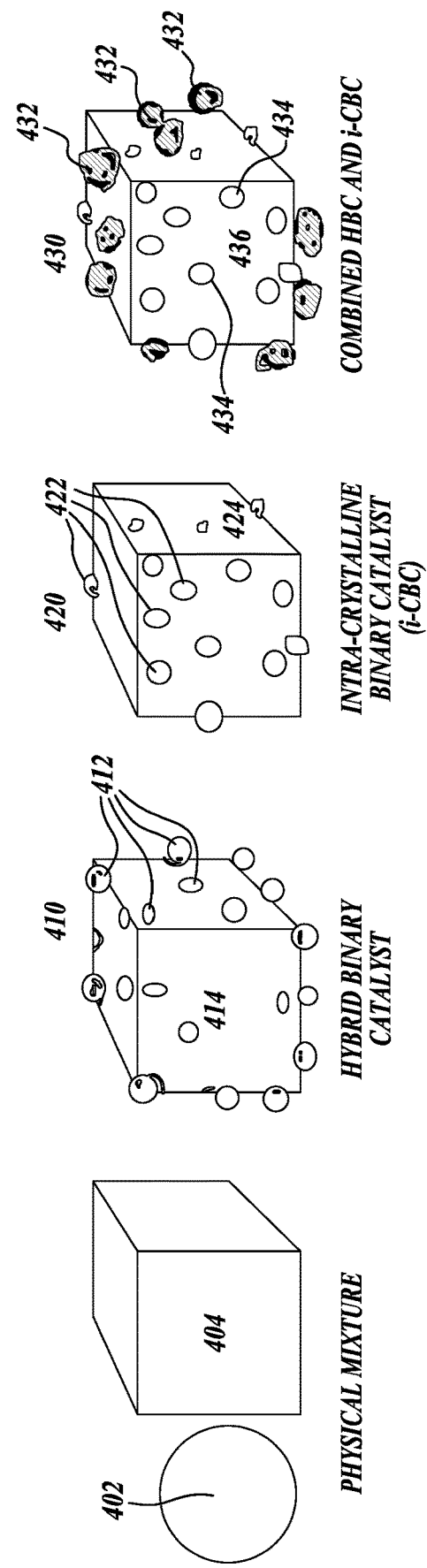
FIG. 1
FIG. 2A PHYSICAL MIXTURE
FIG. 2B HYBRID BINARY CATALYST
FIG. 2C INTRA-CRYSTALLINE BINARY CATALYST (i-CBC)
FIG. 2D COMBINED HBC AND i-CBC

CONVENTIONAL METAL
CATION LOADING

```
┌─────────────────────┐
│ SiO₂ + Al₂O₃ + NaOH │
│  + TEMPLATE + HEAT  │
│      (21 DAYS)      │
└──────────┬──────────┘
           ↓
┌─────────────────────┐
│   CHABAZITE [CHA],  │
│       Na⁺ FORM      │
│      (5 DAYS)       │
└──────────┬──────────┘
           ↓
┌─────────────────────┐
│  EXCHANGE NH₄⁺ FOR  │
│    Na₄ [NH4-CHA]    │
│      (4 DAYS)       │
└──────────┬──────────┘
           ↓
┌─────────────────────┐
│    Cu²⁺ LOADING TO  │
│   OBTAIN Cu-CHA     │
│      (4 DAYS)       │
└─────────────────────┘
```

FIG. 4A

AMMONIA-FACILITATED
METAL CATION-LOADING

```
┌─────────────────────┐
│ ZEOLITE + H₂O + HEAT,│
│   THEN ADD NH₃      │
│      SOLUTION       │
│       (1 DAY)       │
└─────────────────────┘
```

FIG. 4B

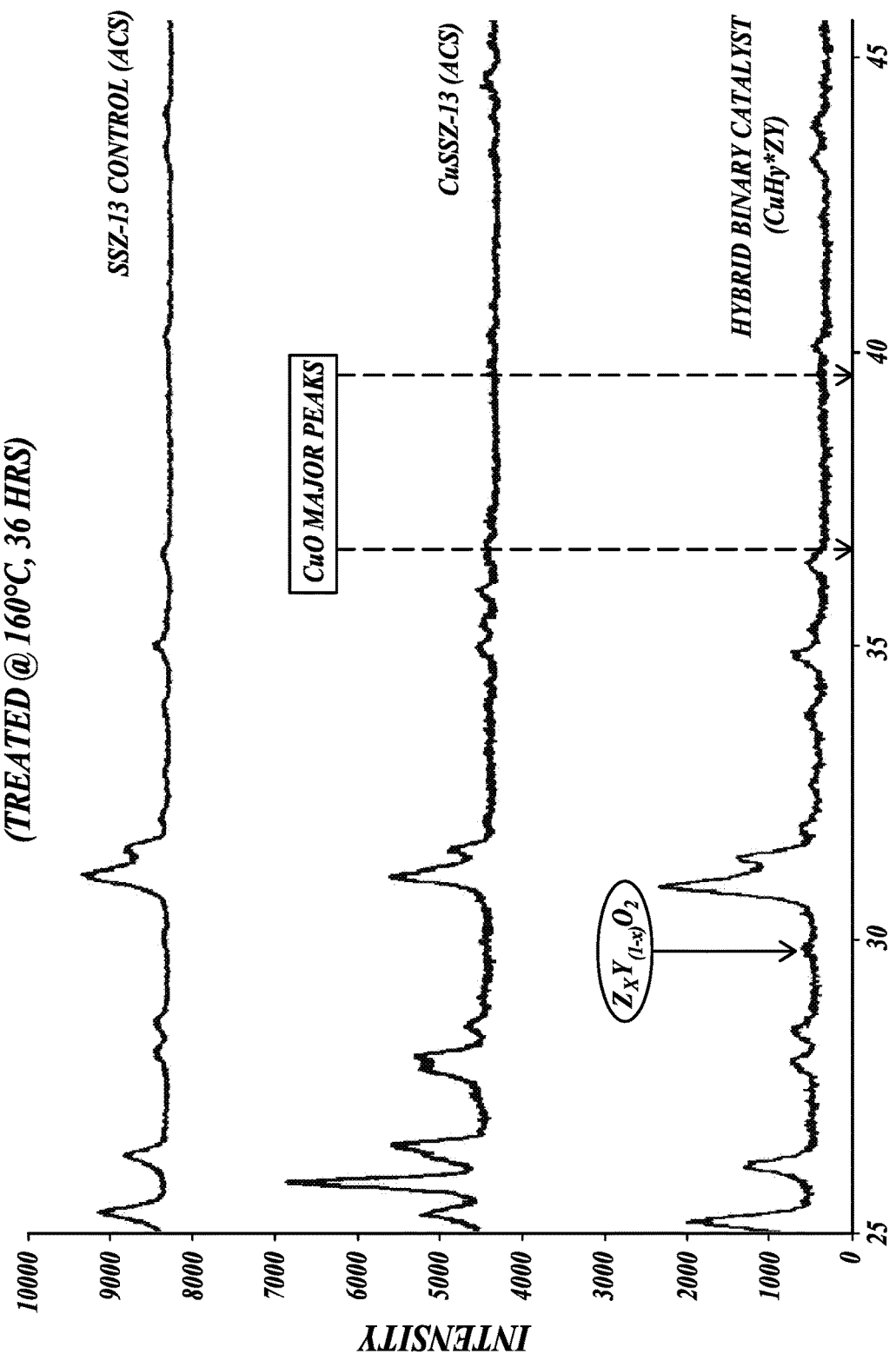

AMMONIA FACILITATED CATION LOADING OF ZEOLITE CATALYSTS

BACKGROUND

Internal combustion engine exhaust emissions, and especially diesel engine exhaust emissions, have come under scrutiny with the advent of stricter regulations, both in the U.S. and abroad. While diesel engines are known to be more economical to run than spark-ignited engines, diesel engines inherently suffer disadvantages in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxides ("$NO_x$"), and sulfur oxides ("$SO_x$"). Aftertreatment systems may be utilized to reduce or eliminate emissions of these and other combustion products.

FIG. 1 shows a block diagram providing a brief overview of a vehicle powertrain. The components include an internal combustion engine 20 in flow communication with one or more selected components of an exhaust aftertreatment system 24. The exhaust aftertreatment system 24 optionally includes a catalyst system 96 upstream of a particulate filter 100. In the embodiment shown, the catalyst system 96 is a diesel oxidation catalyst (DOC) 96 coupled in flow communication to receive and treat exhaust from the engine 20. The DOC 96 is preferably a flow-through device that includes either a honeycomb-like or plate-like substrate. The substrate has a surface area that includes (e.g., is coated with) a catalyst. The catalyst can be an oxidation catalyst, which can include a precious metal catalyst, such as platinum or palladium, for rapid conversion of hydrocarbons, carbon monoxide, and nitric oxides in the engine exhaust gas into carbon dioxide, nitrogen, water, or $NO_2$.

Once the exhaust has flowed through DOC 96, the diesel particulate filter (DPF) 100 is utilized to capture unwanted diesel particulate matter from the flow of exhaust gas exiting engine 20, by flowing exhaust across the walls of DPF channels. The diesel particulate matter includes sub-micron sized solid and liquid particles found in diesel exhaust. The DPF 100 can be manufactured from a variety of materials including but not limited to cordierite, silicon carbide, and/or other high temperature oxide ceramics.

The treated exhaust gases can then proceed through a compartment containing a diesel exhaust fluid (DEF) doser 102 for the introduction of a reductant, such as ammonia or a urea solution. The exhaust gases then flow to a selective catalytic reduction (SCR) system 104, which can include a catalytic core having a selective catalytic reduction catalyst (SCR catalyst) loaded thereon.

System 24 can include one or more sensors (not illustrated) associated with components of the system 24, such as one or more temperature sensors, $NO_x$ sensor, $NH_3$ sensor, oxygen sensor, mass flow sensor, particulate sensor, and a pressure sensor.

As discussed above, the exhaust aftertreatment system 24 includes a Selective Catalytic Reduction (SCR) system 104. The SCR system 104 includes a selective catalytic reduction catalyst which interacts with $NO_x$ gases to convert the $NO_x$ gases into $N_2$ and water, in the presence of an ammonia reductant. The overall reactions of $NO_x$ reductions in SCR are shown below.

$$4NO+4NH_3+O_2 \rightarrow 4N_2+6H_2O \quad (1)$$

$$6NO_2+8NH_3 \rightarrow 7N_2+12H_2O \quad (2)$$

$$2NH_3+NO+NO_2 \rightarrow 2N_2+3H_2O \quad (3)$$

Where Equation (1) represents a standard SCR reaction and Equation (3) represents a fast SCR reaction.

The performance of the SCR catalyst is often counterbalanced by catalyst durability. This challenge is further compounded by the increasingly stringent emissions regulatory demands on the one hand, and the economic pressure surrounding fuel economy on the other. Furthermore, the performance of the SCR catalyst is influenced by the level of engine out $NO_x$ (EO $NO_x$) that has to be processed by the SCR catalyst. The current trend is in the direction of higher engine out $NO_x$ to improve fuel economy, while emission levels are simultaneously being reduced. For example, at present, EO $NO_x$ can reach as high as 7 g/kW-hr for at least a short period of time. However, it is anticipated that in the future, there will be a move towards very low tailpipe $NO_x$ (e.g., decreasing from about 0.2 to about 0.02 g/kW-hr).

High EO $NO_x$ has been shown to result in urea deposit build up in the SCR, due to the extremely high levels of diesel exhaust fluid that is introduced into the system, and insufficient residence time for complete decomposition to form $NH_3$. The formation and accumulation of urea deposits on the SCR catalyst can result in severe damage to both the chemical and physical integrity of the SCR coating. Furthermore, the high intensity of diesel exhaust fluid dosing and the relatively long duration of the dosing in urea decomposition reactor can result in large quantities of water being released onto the SCR catalyst. As the SCR catalyst can be primarily composed of zeolites, which are powerful water adsorbing materials, the quantities of water can present a problem with both durability and cold start performance of the SCR catalyst.

At low EO $NO_x$ conditions, challenges are similar to those present under extended idling and cold start conditions. In other words, when SCR temperatures are too low for diesel exhaust fluid dosing and normal SCR operation (between about 250-450° C.), other strategies are required to meet emissions standards.

Without wishing to be bound by theory, it is believed that the advent of engine gas recirculation (EGR) has resulted in reduced peak in-cylinder temperatures for combustion to reduce engine out $NO_N$. The reduced peak in-cylinder temperatures are highly desirable from an emissions control perspective. However, the lower peak in-cylinder temperatures also result in undesirable lower fuel economy. The reduced engine exhaust temperatures that result from increasing use of EGR also have a negative impact on cold-start conditions for engine aftertreatment system (EAS) performance. Effective emissions control by EAS requires temperatures of at least 200° C. to be attained before DEF dosing may commence. Therefore, during the EAS heat-up period under cold-start conditions (i.e., at temperatures of less than 200° C.), there is no emissions control.

Thus, some challenges that are encountered in emissions control include:

(1) Cold-start conditions with relatively low engine exhaust temperatures. While cold start conditions can be addressed by close coupling the SCR to the engine to achieve maximum heat-up rate, with exposure of the SCR catalyst to non-pretreated exhaust directly from the engine; however, only partial $NO_x$ reduction can be achieved in this manner. Therefore, a second downstream SCR (or a SCRF) is required.

(2) Increased system size and complexity, which arise when the EAS includes a close coupled zeolite-based SCR, therefore, a DOC upstream of the SCR is required for $NO_2$-make for optimal performance, with a DEF doser and an ammonia slip catalyst (ASC), also called an ammonia oxidation catalyst (AMOX), downstream of the SCR to decrease $NH_3$ slip into the DOC. In some instances, while a close coupled vanadia-based SCR would not require a DOC upstream of the SCR, there exists a risk of sublimed vanadium escaping into the environment.

(3) Space limitations for close coupling, which require that the EAS be made more compact, for example, by combining SCR and DPF to form a SCRF, which presents the following challenges:

Competition between the fast SCR reaction and soot oxidation reaction for the available $NO_2$ from the DOC;
  (ii) No passive soot oxidation, because platinum group metals (PGMs) cannot be used on the DPF substrate due to the presence of $NH_3$ for the SCR reaction. Oxidation of $NH_3$ with PGMs also produces $N_2O$, which is an undesirable greenhouse gas.
  (iii) The reduced ash loading capacity of the SCRF relative to a DPF and the associated higher pressure change ($\Delta P$) dictate a shorter ash cleaning interval and higher cost of ownership for the consumer.
  (iv) The potential for $NH_3$ and/or DEF to suppress passive soot oxidation due to:
    (a) Neutralization of $NO_2$ by ammonium nitrate formation, and/or
    (b) Deposition of undecomposed urea particulates onto the catalysts from DEF, which contribute to $\Delta P$ and potential catalyst poisoning.

(4) The potential for increased poisoning and hydrothermal aging of EAS catalysts are a major concern that arises from both close coupling of the SCR and in particular, when SCR on DPF (e.g., SCRF) technologies are employed.

(5) Increasingly stringent emissions regulations are likely to be enforced in the future; including tailpipe (TP) $NO_x \leq 0.02$ g/kw-hr, lower $N_2O$ emissions standards, and generally tightened greenhouse gas regulation.

Without wishing to be bound by theory, it is believed that the properties of synthetic aluminosilicate zeolite molecular sieves form the basis of numerous commercially important catalytic, adsorption, and ion exchange applications due to a unique combination of high surface area, uniform porosity, and electrostatically-charged sites induced by tetrahedrally coordinated $Al^{3+}$. It is believed that the active sites of zeolites can be modified and adsorbents and catalysts can be tailor-made for a wide range of uses.

Emissions control is one of the most important uses for zeolite-based catalysts. To increase copper loading, which leads to increased ammonia storage, two main strategies have been used by catalyst suppliers:

(1) Increased $Al_2O_3$ content of the zeolite (for locking Cu ions in place in the zeolite framework) increases the number of catalytic sites for ammonia storage and $NO_x$ reduction. For example, the Cu can be held in close association with the $Al^{3+}$ sites of the framework by ion exchange forces (e.g., ionic bonds), and can have a certain degree of mobility and can be exchanged with other cationic species. However, higher $Al_2O_3$ content results in lower $SiO_2$ content and reduced durability. Therefore, the optimum Si/Al ratio is considered to be 12, which provides a compromise between ammonia storage, $NO_x$ reduction, and catalyst durability. As used herein, the term "framework" refers to the crystal lattice of a given material.

(2) Prolonged (and often repeated) dilute copper exchange steps are required for achieving optimal copper loading in zeolite catalysts, while minimizing formation of copper oxide (CuO). Copper oxide is not catalytically active for NOx conversion, but is directly responsible for $N_2O$ formation, particularly in the presence of $NO_2$. In particular, it is believed that formation of CuO occurs under two conditions:
  (a) To decrease the likelihood of CuO formation during copper loading, very dilute copper solutions, extended ion exchange procedure times, and acid conditions (pH ~3) are used. The acidic conditions maintain CuO in solution and decrease the likelihood of deposition on the zeolite crystal surface.
  (b) Catalyst aging causes copper migration from the active sites created by $Al_2O_3$ content to form CuO crystals outside of the (Si/Al) framework. High copper loading in the zeolite framework tends to cause more than one copper ion in each location, thus facilitating CuO nanocrystal formation in the zeolite crystal upon aging. When nanocrystals of CuO form within the zeolite crystal, this can erode the crystal structure from the inside, and contribute to physical damage of the catalyst in the aging process (in addition to contributing to $N_2O$-make). In order to minimize this occurrence, very dilute copper exchange solutions and long process times are employed. In addition, ion exchange is an equilibrium process, which sets a limitation on how much copper can be loaded into the available active sites of the zeolite during each loading step; thereby limiting catalytic activity. Thus, multiple copper loading steps with dilute solution is a common practice.

Prolonged ion exchange procedures in relatively dilute solution achieve the desired level of copper loading for conventional SCR catalysts. A strategy based upon decreasing (Si/Al) ratio enables the optimization of ammonia storage. However, this approach tends to reduce hydrothermal durability as aluminum content increases.

A strategy based upon decreasing (Si/Al) ratio enables the optimization of ammonia storage. However, this approach tends to reduce hydrothermal durability as aluminum content increases. Likewise, the manipulation of other process parameters to achieve the same goal can potentially reduce low temperature durability. Therefore, the achievement of ultra-low NOx emissions requires the development of new synthetic approaches for making catalyst compositions. The present disclosure seeks to fulfill these needs and provides further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features: a method of making a metal cation-loaded hybrid binary catalyst composition, including: providing a mixture including a zeolite, a chelating agent, a metal cation precursor, a metal oxide precursor, and a solvent; adding an aqueous ammonia solution to adjust the pH of the mixture to greater than or equal to 10; stirring the mixture to provide a slurry including a crude metal cation-loaded hybrid binary catalyst composition; isolating the crude metal cation-loaded hybrid binary catalyst composition from the slurry; and calcining the isolated crude metal cation-loaded hybrid binary catalyst composition to provide the metal cation-loaded hybrid binary catalyst composition.

In another aspect, the present disclosure features a method of making a metal cation-loaded intra-crystalline binary catalyst composition, including: providing a mixture including an intra-crystalline binary catalyst, a metal cation precursor, and a solvent, wherein the intra-crystalline binary catalyst has a zeolite crystal lattice including a metal oxide covalently bound to elements within the zeolite crystal lattice; adding an aqueous ammonia solution to adjust the pH of the mixture to greater than or equal to 10; stirring the mixture to provide a crude metal cation-loaded intra-crystalline binary catalyst composition; isolating the crude metal cation-loaded intra-crystalline binary catalyst composition from the mixture; and calcining the isolated crude metal cation-loaded intra-crystalline binary catalyst composition to provide the metal cation-loaded intra-crystalline binary catalyst composition.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 1 is a block diagram of an example of an aftertreatment system coupled to an internal combustion engine.

FIG. 2A is an illustration of a physical mixture of metal zeolite and metal oxide.

FIG. 2B is an illustration of a hybrid binary catalyst.

FIG. 2C is an illustration of an intra-crystalline binary catalyst of the present disclosure.

FIG. 2D is an illustration of an embodiment of an intra-crystalline binary catalyst of the present disclosure having additional metal oxides nanoparticles covalently bound to the surface of the metal zeolite.

FIG. 4A is a flow chart of a conventional metal cation loading process.

FIG. 4B is a flow chart of an embodiment of a metal cation loading process of the present disclosure.

FIG. 6B shows x-ray diffraction patterns of embodiments of binary catalyst compositions of the present disclosure (CuSSZ-13 and CuHy*ZY, corresponding to copper SSZ-13 zeolite (control) and a copper SSZ-13 hybrid binary catalyst with extra-crystalline yttrium-doped zirconium nanoparticles, respectively).

DETAILED DESCRIPTION

Figure 3:
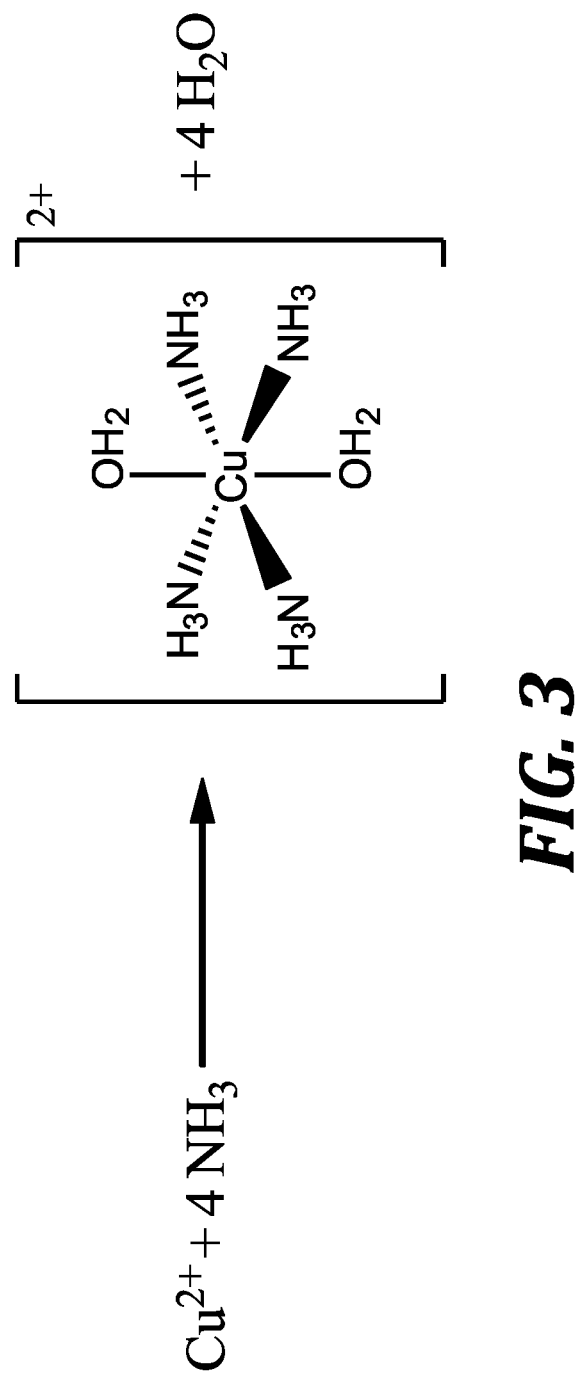
FIG. 3 illustrates an example of an active species for ammonia-facilitated copper loading.

The present disclosure features a high metal cation content zeolite-based binary catalyst (e.g., a high copper and/or iron content zeolite-based binary catalyst, where the zeolite can be a chabazite) for $NO_x$ reduction. The binary catalyst has relatively low $N_2O$ make, and has low copper oxide or iron oxide content in the zeolite phase of the catalyst. The present disclosure also describes the synthesis of the zeolite-based binary catalyst having high metal cation content.

The binary catalyst compositions of the present disclosure include a primary catalyst (e.g., a metal zeolite) and a secondary catalyst (e.g., a metal oxide). The primary catalyst and the secondary are associated by covalent bonds, and are not mere physical mixtures. The binary catalyst compositions include a hybrid binary catalyst, an intra-crystalline binary catalyst composition, or a combination of a hybrid binary catalyst and intra-crystalline binary catalyst, which can occur on the same catalyst particle.

FIG. 2A-2C schematically illustrates the structural differences between a physical mixture of metal oxides with a metal zeolite (FIG. 2A), a hybrid binary catalyst (FIG. 2B), and the intra-crystalline binary catalyst compositions (FIG. 2C). FIG. 2A shows a physical mixture of metal oxides 402 with metal zeolites 404, where both are micron sized and exist as separate particles that are physically mixed with one another. FIG. 2B shows a hybrid binary catalyst 410, where small metal oxide nanoparticles 412 are covalently attached to the surface of larger metal zeolite particles 414. FIG. 2C is an illustration of the intra-crystalline binary catalyst composition 420, where nanoparticles of metal oxides 422 are covalently incorporated into and throughout the crystal lattice of metal zeolite 424. FIG. 2D is a combination of a hybrid binary catalyst 430 and an intra-crystalline binary catalyst composition, and thus also includes an intra-crystalline binary catalyst composition. In FIG. 2D, metal oxide nanoparticles 432 are covalently attached to the surface of the metal zeolite particles 436 and metal oxide nanoparticles 434 are also covalently bound throughout the crystal lattice of the metal zeolite's crystal framework. The composition of the metal oxide nanoparticles 432 and 434 can be the same, or different.

The synthetic procedure for making the zeolite-based binary catalyst having a high metal cation content includes a relatively high concentration metal cation (e.g., copper cation and/or iron cation) loading solution and a rapid process, with the following features:

i. A single metal cation (e.g., copper and/or iron cation) loading step, at a concentration of 0.01 M or more (e.g., 0.01 M or more, 0.05 M or more, 0.1 M or more, 0.25 M or more, 0.5 M or more, or 0.75 M or more) and/or 1 M or less (e.g., 0.75 M or less, 0.5 M or less, 0.25 M or less, 0.1 M or less, 0.05 M or less, or 0.01 M or less), representing only a fraction of the solution volume employed in a conventional ion-exchange reaction, with greatly reduced waste disposal volumes.

ii. Accelerated metal cation (e.g., copper and/or iron cation) loading, with reaction completion in seconds or minutes, rather than repeated one-hour periods in a conventional ion-exchange reaction. Ammonia-facilitated metal cation (e.g., copper and/or iron cation) loading is achieved by adding ammonium hydroxide solution, instead of acidifying the reaction mixture as in a conventional ion-exchange reaction. Therefore, by combining the ammonia storage and metal cation exchange properties of the zeolite, a faster, more effective, and cost efficient metal cation loading process is achieved. FIG. 3 illustrates an example of an active species for ammonia-facilitated copper loading.

iii. After a few minutes in the ammonia/metal cation (e.g., copper and/or iron cation) solution at a selected temperature (e.g., from 25° C. up to 80° C.), the mixture can be cooled in an ice-bath, and the metal cation-loaded zeolite-based binary catalyst product can be recovered and washed with deionized water. Washing includes an optional use of a portion of acidified (pH-3) deionized (DI) water to extract any excess metal cation that could later contribute to metal oxide (e.g., CuO or iron oxide) formation. Furthermore, the acid wash ensures that metal oxides (e.g., CuO or iron oxide) that may have formed in the zeolite phase is dissolved and washed-out.

iv. Improvement in ammonia facilitated metal cation loading process can be applied to both hybrid binary catalysts (HBC), as described, for example, in U.S. application Ser. No. 15/612,815 filed Jun. 2, 2017 and issued as U.S. Pat. No. 10,675,586 on Jun. 9, 2020 and in U.S. application Ser. No. 15/612,833, filed Jun. 2, 2017 which has been published as US Publication No. 2018/0345217 on Dec. 6, 2018 and allowed on Jul. 15, 2020, each of which is incorporated herein by reference in its entirety; and intra-crystalline binary catalysts (i-CBC), described in concurrently filed U.S. application Ser. No. 16/377,035 which has been published as US Publication No. 2020/0316571 on Oct. 8, 2020 and allowed on Sep. 30, 2020, and entitled "Intra-Crystalline Binary Catalysts and Uses Thereof," the disclosure of which is herein incorporated in its entirety. Without wishing to be bound by theory, it is believed that the metal oxide (selective catalytic oxidation, SCO) phase in each of these materials has a high affinity for both $NH_3$ and metal cations (e.g., $Cu^{2+}$).

v. Ammonia-facilitated cation exchange can be employed for fast and efficient loading of other cations. Furthermore, in the presence of more than one cationic species, competition can favor the cation with the smallest solvated ionic radius and highest charge density at a given temperature. Increasing the reaction temperature can lead to expansion of crystal lattice parameters, which in turn can encourage the incorporation of larger solvated ionic species. Therefore, selective loading of a particular metal cation with minimal to no contamination of hetero-cations in the zeolite framework is possible, while simultaneously forming metal oxide nanoparticles on the zeolite surface in catalyst synthesis. In one embodiment, the process can be used for the preparation of iron cation-loaded zeolite-based binary catalysts.

Definitions

As used herein, "hybridization," "hybridizing," or "hybridized" refers to the chemical reaction between precursor molecules with specific elements on the surface of the metal zeolite, resulting in formation of bonds (e.g., covalent bonds, and/or ionic bonds) between the precursors and elements in the metal zeolite in the metal oxide nanoparticles. The hybridization can be verified using scanning transmission electron microscopy with elemental analysis, X-ray diffraction, and electron energy loss spectroscopy (EELS) microstructural analysis techniques. For example, elemental mapping of metal oxide and any cationic dopants can show an aggregate of metal oxide nanoparticle, and Si and/or Al in the zeolite can be present in the metal oxide phase, with no zeolite crystal present in the background. Furthermore, STEM studies can indicate that the metal oxide phase is crystalline. Therefore, it is reasonable to assume that the incorporation of Si and Al into the metal oxide phase is by way of covalent and/or ionic bonds in the $ZrO_2$ crystal lattice. Without wishing to be bound by theory, it is believed that a metal oxide precursor first forms a coordination bond with the surface atoms of a zeolite (i.e., Si and/or Al), which is facilitated by the use of a chelating agent, such as urea, in the reaction mixture. The formation of this coordination complex causes disruptions in the crystal structure near the surface. Therefore, a certain degree of deconstruction of the zeolite surface layer(s) occurs to release Si and/or Al for incorporation into the metal oxide phase as it forms.

As used herein, "intra-crystalline" refers to incorporation of an element into a host material's crystal lattice structure, where the element occupies a crystal lattice site that would otherwise be occupied by an atom of the host material. The element forms one or more covalent bonds with the atoms of the crystal lattice and can replace a host's atom in the crystal lattice.

As used herein, "loading" is synonymous to "exchanging," and "loaded" is synonymous to "exchanged," and refer to the replacement of one cation at an ion exchange site in the zeolite with a target cation (e.g., $Cu^{2+}$ and/or $Fe^{3+}$), through an ion exchange mechanism.

As used herein, "doping" refers to the formation of covalent bonds where an introduced cation becomes incorporated into the lattice structure of the host. For example, doping occurs when elements such as yttrium are introduced into the metal oxide $ZrO_2$, and when copper from an exemplary Cu-loaded SSZ-13 framework is scavenged by the metal oxide (where the copper is covalently bound into the metal oxide's lattice structure). Therefore, compared to loading, doping is a more permanent form of cation sequestration.

As used herein, "microporous" refers to material having pores of a maximum pore dimension of up to 2 nm, "mesoporous" refers to a material having pores of a maximum pore dimension of from 2 to 50 nm, and "macroporous" refers to a material having pores of a maximum pore dimension of greater than 50 nm. The maximum pore dimension refers to the maximum cross-section in a given pore of irregular or regular shape.

As used herein, "oxidative power" is defined as the temperature at which 50% of the CO is oxidized to $CO_2$ when a simulated exhaust stream including nitric oxide (600 ppm), ethylene (75 ppm $C_2H_4$), CO (300 ppm), oxygen (10%), carbon dioxide (5.6%), water (6%), and nitrogen (the balance of simulated exhaust stream), is exposed to a catalyst (e.g., a metal oxide catalyst) at a space velocity of 60,000 $hr^{-1}$ in a reverse light off study (starting at 600° C., to a temperature of 160° C.). As an example, a metal oxide with a relatively low oxidative power has a ($T_{50}CO$) of >600° C. (e.g., $ZrO_2$), while a metal oxide with relatively high oxidative power has a ($T_{50}CO$) of <500° C.

As used herein, "reductive power" refers to the ability to enhance the $NO_x$ storage property to enhance $NO_x$ conversion.

As used herein, "significantly" or "substantially" refers to greater than 90% (e.g., greater than 95%, or greater than 98%).

As used herein, "about" refers to ±5% (e.g., ±3%) of a given value.

As used herein, a selective catalytic oxidation (SCO) catalyst is a catalyst that facilitates:
  i. Formation of $NO_2$ species in situ by the reaction of $NO + ½ O_2 \rightarrow NO_2$, to serve as reactive intermediates from nitrogen oxides in the exhaust stream, without significantly oxidizing $NH_3$ into $N_2O$. For embodiments of the catalysts of the present disclosure, even if $NH_3$ oxidation occurs, in some instances the primary product is $N_2$, which is a desirable outcome.
  ii. Hydrocarbon oxidation at considerably lower temperatures, for example, the oxidation of longer chain unsaturated hydrocarbons such as propylene.

As used herein, a selective catalytic reduction (SCR) catalyst is a catalyst that catalyzes the reduction of $NO_x$ to nitrogen and water.

As used herein, a urea hydrolysis catalyst is a catalyst that hydrolyzes urea and isocyanic acid (HNCO) with minimal or zero formation of high molecular weight aromatic (HMAr) compounds such as cyanuric acid, ammilide, ammeline, and/or melamine.

As used herein, a DPF catalyst is a catalyst that captures soot particles and contains platinum group metals (PGM) for $NO_2$-make to facilitate soot lightoff at relatively low temperatures (e.g., <350° C.) for passive soot oxidation. The DPF can also serve as an ash storage device.

As used herein, a DOC is a catalyst that oxidizes gases and other volatile particulates from the engine exhaust, including hydrocarbons, CO and NO (which is oxidized to make $NO_2$, made possible by the relatively high PGM loading.

As used herein, an ammonia oxidation (AMOX) catalyst is a catalyst that includes a layer of PGM (such as a DOC), covered by a SCR catalyst layer, which is located after a SCR to carry out dual functions of (1) reducing $NO_N$, and (2) scavenge excess $NH_3$ and selectively oxidize $NH_3$ to $N_2$, thus avoiding $NH_3$ slip.

As used herein, a 4-way catalyst is a catalyst that can serve the roles of a DOC, DPF catalyst, SCR catalyst, urea hydrolysis catalyst, and AMOX catalyst concurrently.

Metal Cation Loading Procedure

Metal Cation Loading of a Hybrid Binary Catalyst

In some embodiments, the present disclosure features a method of making a metal cation-loaded hybrid binary catalyst composition, including providing an aqueous solution including a chelating agent, a metal cation precursor, and a metal oxide precursor; mixing the aqueous solution with a zeolite to provide a reaction mixture; optionally heating the reaction mixture; adding an aqueous ammonia solution to the reaction mixture to adjust the pH to 10 and above; stirring the reaction mixture to provide a crude metal cation-loaded binary catalyst composition, isolating crude metal cation-loaded binary catalyst composition by filtration; and calcining the crude metal cation-loaded binary catalyst composition to provide the metal cation-loaded hybrid binary catalyst composition. The metal cation-loaded hybrid binary catalyst composition includes a plurality of metal oxide nanoparticles bound to the surface (exterior and/or interior surfaces) of the zeolite.

The metal cation loading methods can include simultaneous incorporation of metal cations into the metal oxide nanoparticle phase, and the hybridization of the metal oxide nanoparticles onto the exterior surface of zeolite crystals and the surface of pores (interior surface) in the zeolite crystals to form a metal cation-loaded hybrid binary catalyst.

The metal cation-loaded hybrid binary catalyst composition can have a loaded metal cation content of 0.01 wt % or more (e.g., 1 wt % or more, 3 wt % or more, or 5 wt % or more) and/or 7 wt % or less (e.g., 5 wt % or less, 3 wt % or less, or 1 wt % or less). In some embodiments, the metal cation-loaded hybrid binary catalyst composition has a loaded metal cation content of from 0.01 wt % to 7 wt % (e.g., from 1 wt % to 7 wt %, from 3 wt % to 7 wt %, or from 5 wt % to 7 wt %).

The chelating agent can include, for example, urea. The chelating agent can be present in the reaction mixture, which includes a chelating agent, a metal cation precursor, a metal oxide precursor, and zeolite, at a concentration of 0.3% or more (e.g., 0.6% or more, 1% or more, 2% or more, or 2.5% or more) and/or 5% or less (e.g., 4% or less, 3% or less, 2% or less, 1% or less, or 0.6% or less) by weight.

The metal oxide precursor can include, for example, $ZrOCl_2 \cdot 8H_2O$, $NaVO_3$, $BaCl_2$, $(NH_4)_6Ce^{4+}(NO_3)_4$, $KMnO_4$, $Co(NO_3)_2$, $Cr(NO_3)_3$, $CaCl_2$, barium nitrate, ammonium molybdate tetrahydrate, calcium nitrate tetrahydrate, nickel nitrate, titanium chloride, and/or tungsten chloride. In some embodiments, the metal oxide precursors include zirconium oxychloride octahydrate, zirconium oxynitrate hydrate, yttrium chloride, barium nitrate, ferric nitrate, hexammine cobalt (III) chloride, and/or hexammine cobalt (III) chloride. The metal oxide precursor can be present in the reaction mixture at a concentration of from 0.1 mM to 20 mM (e.g., from 1 mM to 20 mM, from 5 mM to 20 mM, from 10 mM to 20 mM, or from 5 mM to 15 mM) prior to addition of ammonia. In some embodiments, the metal oxide precursor can be present in the reaction mixture at a concentration of 0.1 mM or more (e.g., 1 mM or more, 5 mM or more, 10 mM or more, or 15 mM or more) and/or 20 mM or less (e.g., 15 mM or less, 10 mM or less, 5 mM or less, or 1 mM or less).

Metal Cation Loading of an Intra-Crystalline Binary Catalyst

In some embodiments, the present disclosure features a method of making a metal cation-loaded intra-crystalline binary catalyst composition, including providing a reaction mixture including an intra-crystalline binary catalyst (i-CBC) and a metal cation precursor in a solvent (e.g., an aqueous solvent, or water); optionally heating the reaction mixture; adding an aqueous ammonia solution to adjust the pH to 10 and above, stirring the mixture to provide a crude metal cation-loaded intra-crystalline binary catalyst composition; isolating the crude metal cation-loaded intra-crystalline binary catalyst composition (e.g., by filtration); optionally washing with deionized water and/or with an aqueous acid solution of about pH 3; and calcining the crude solid metal cation-loaded intra-crystalline binary catalyst composition to provide the metal cation-loaded intra-crystalline binary catalyst composition. The intra-crystalline binary catalyst composition includes a zeolite having a crystal lattice that incorporates a metal oxide, wherein the metal oxide is covalently bound to elements within the crystal lattice. The metal oxide forms an integral part of the zeolite crystal lattice, forming covalent bonds with at least the Si or Al atoms within the crystal lattice of the zeolite, and is dispersed throughout the zeolite crystal lattice. The metal oxide can substitute atoms within the crystal lattice of the zeolite. When loaded with a metal cation, the loaded metal cation can be dispersed throughout the intra-crystalline binary catalyst. In some embodiments, the loaded metal cation is dispersed throughout the zeolite crystal lattice. In some embodiments, the metal cation is dispersed in the metal oxide that is in the zeolite crystal lattice and/or on the surface (exterior and or interior) of the zeolite.

The metal cation-loaded intra-crystalline binary catalyst composition can have a loaded metal cation content of 0.01 wt % or more (e.g., 1 wt % or more, 3 wt % or more, or 5 wt % or more) and/or 7 wt % or less (e.g., 5 wt % or less, 3 wt % or less, or 1 wt % or less). In some embodiments, the metal cation-loaded intra-crystalline binary catalyst composition has a loaded metal cation content of from 0.01 wt % to 7 wt % (e.g., from 1 wt % to 7 wt %, from 3 wt % to 7 wt %, or from 5 wt % to 7 wt %).

Reagents and Reaction Conditions for Metal Cation Loading of a Hybrid Binary Catalyst or of an Intra-Crystalline Binary Catalyst In any of the above-described methods, the zeolite in the reaction mixture can be an aluminosilicate zeolite. For example, the aluminosilicate zeolite can be SSZ-13 chabazite, other aluminosilicate zeolites having SSZ-type zeolite structures, ZSM-5, and/or β-zeolite. The zeolite can be present in the reaction mixture at a concentration of 10% or more (e.g., 13% or more, 15% or more, or 17% or more) and/or 20% or less (e.g., 17% or less, 15% or less, or 13% or less) zeolite by weight, prior to addition of aqueous ammonia. In some embodiments, the zeolite is present in the mixture at a concentration of from 10% to 20% (e.g., from 15% to 20%, from 10% to 15%, or from 13% to 17%) zeolite by weight, prior to addition of aqueous ammonia.

In any of the above-described methods, the metal cation precursor can include, for example, copper sulfate, copper nitrate, copper chloride, ferric chloride, and/or ferric nitrate. The metal cation precursor can be present in the ion exchange reaction mixture at a concentration of 0.01 M or more (e.g., 0.01 M or more, 0.05 M or more, 0.1 M or more, 0.25 M or more, 0.5 M or more, or 0.75 M or more) and/or 1 M or less (e.g., 0.75 M or less, 0.5 M or less, 0.25 M or less, 0.1 M or less, 0.05 M or less, or 0.01 M or less). In some embodiments, the metal cation precursor (e.g., a Cu cation precursor) can be present in the ion exchange reaction mixture at a concentration of from 0.1 M to 0.25 M.

In any of the above-described methods, the aqueous solution can include water as the only solvent. In some embodiments, the aqueous solution can include an aqueous solvent. Aqueous solvents can be favorable to coordination chemical reactions, and be cost effective (e.g., for both reagent and waste disposal).

In any of the above-described methods, the aqueous ammonia solution can have an ammonia concentration of 28 wt %. The aqueous ammonia solution can be added to the reaction mixture in a single aliquot. In some embodiments, the aqueous ammonia solution is added to the reaction mixture over a period of 3 seconds or more (e.g., 10 second or more, 30 seconds or more, 1 minute or more, 2 minutes or more, 3 minutes or more, or 4 minutes or more) and/or 5 minutes or less (e.g., 4 minutes or less, 3 minutes or less, 2 minutes or less, 1 minute or less, 30 seconds or less, or 10 seconds or less). In some embodiments, the metal cation loading reaction is complete within 3 seconds or more (e.g., 10 second or more, 30 seconds or more, 1 minute or more, 2 minutes or more, 3 minutes or more, or 4 minutes or more) and/or 5 minutes or less (e.g., 4 minutes or less, 3 minutes or less, 2 minutes or less, 1 minute or less, 30 seconds or less, or 10 seconds or less) of aqueous ammonia addition. The reaction mixture can include ammonia at a concentration of 5% or more (e.g., 6% or more, or 8% or more) and/or 10% or less (e.g., 8% or less, or 6% or less) by weight. The pH of the reaction mixture after ammonia addition can be 10 or more, or 11 or more. For example, the pH of the reaction mixture after ammonia addition can be around 10, around 10.5, or around 11.

In any of the above-described methods, the reaction mixture can be heated to a predetermined temperature of 40° C. or more (e.g., 50° C. or more, 60° C. or more, 70° C. or more, or 80° C. or more) and/or 90° C. or less (e.g., 80° C. or less, 70° C. or less, 60° C. or less, or 50° C. or less). The aqueous ammonia solution can be added to the reaction at the predetermined temperature.

In any of the above-described methods, isolation of the metal cation-loaded catalyst can include cooling the reaction mixture to room temperature (e.g., about 21° C.) if the reaction mixture was heated, filtering the reaction mixture to obtain the crude solid metal cation-loaded catalyst, and washing the crude solid metal cation-loaded catalyst with water. In some embodiments, the metal cation-loaded catalyst is further washed with an acidified aqueous solution prior to calcining, to remove excess active metal cations and tailor the amounts of loaded metal cation (e.g., $Cu^2$) to the optimal desired ion exchange capacity. The acidified aqueous solution can have a pH of 2 or more and/or 4 or less. For example, the acidified aqueous solution can have a pH of about 3. The acid in the acidified aqueous solution can be, for example, sulfuric acid, nitric acid, hydrochloric acid, lactic acid, and/or citric acid.

Once washed, the metal cation-loaded catalyst can be dried. Drying can occur at room temperature (RT) or at 30° C. or more (e.g., 40° C. or more, 50° C. or more, 60° C. or more, or 70° C. or more) and/or 80° C. or less (e.g., 70° C. or less, 60° C. or less, 50° C. or less, or 40° C. or less) for a duration of 8 hours or more (e.g., or 10 hours or more) and/or 12 hours or less (e.g., or 10 hours or less).

The metal cation-loaded catalyst can be calcined at a temperature of 500° C. or more (e.g., 550° C. or more, 600° C. or more, or 700° C. or more) and/or 800° C. or less (e.g., 700° C. or less, 600° C. or less, or 550° C. or less) for a duration of 3 hours or more (e.g., 4 hours or more) and/or 5 hours or less (e.g., 4 hours or less). In some embodiments, the metal cation-loaded catalyst can be calcined at a temperature of 600° C. for 4 hours.

As an example, in some embodiments, the metal cation is loaded into the catalytic composition using the following procedure:

1. A metal cation salt (e.g., copper sulfate) is dissolved in deionized (DI) water, together with the intra-crystalline binary catalyst, in the appropriate proportions.

2. Heat is applied with vigorous stirring to achieve a predetermined temperature (e.g., 80° C.);

3. At the predetermined reaction temperature, a quantity of aqueous ammonia (e.g. a 28% $NH_3$ aqueous solution) is added to the reaction mixture. Metal cation loading (e.g., copper loading) occurs instantaneously, while the relatively high basic $NH_3$ concentration maintains the metal cation (e.g., $Cu^{2+}$) in solution and decreases the likelihood of CuO crystallite formation. Optionally, continued vigorous stirring and applied heat for a predetermined number of minutes can allow for maximum metal cation loading under the prevailing conditions.

4. The product is cooled in an ice bath, filtered, followed by extensive washing with DI water. This optionally includes washing with a quantity of acidified DI water to tailor the amounts of loaded metal cation (e.g., $Cu^{2+}$) to the optimal desired ion exchange capacity.

5. The metal cation-loaded catalyst is dried at room temperature (RT) for at least 8-12 hours.

6. Calcining the metal cation-loaded catalyst (e.g., for 4 hours at 600° C.).

Metal Cation-Loaded Binary Catalyst Characterization and Properties

The metal cation-loaded binary catalyst compositions of the present disclosure can be analyzed by inductively coupled plasma (ICP) spectroscopy to determine elemental composition, X-ray diffraction (XRD) for crystal structure determination, BET for pore size and surface area determination, and thermogravimetric analysis (TGA) for determining effectiveness of the catalyst in DEF thermolysis, as known to a person of skill in the art. Emissions control capabilities can be determined by a synthetic gas bench (SGB) procedure for 1"×3" core samples, and by on-engine testing behind a 13 L (class 8) diesel engine on a dynamometer.

In some embodiments, the metal cation-loaded binary catalyst composition has a metal cation content of 2 wt % or more (e.g., 3 wt % or more, 4 wt % or more, 5 wt % or more, or 6 wt % or more) and/or 7 wt % or less (e.g., 6 wt % or less, 5 wt % or less, 4 wt % or less, or 3 wt % or less).

In some embodiments, the metal cation-loaded binary catalyst compositions of the present disclosure have improved low temperature $NO_x$ reduction at 250° C. ranging from 90% to 97% (e.g., or 95% to 97%); lower CuO content; and lower $N_2O$ production compared to zeolite-based binary catalyst compositions that have been loaded with metal cations using equilibrium ion exchange methods. In some embodiments, the $N_2O$ peak production at 250° C. is from 13 ppm to 15 ppm (with equal amounts of $NO_2$ and $NO_x$ in the exhaust), while the tailpipe RMC cycle (not-to-exceed) standard is 19 ppm for heavy-duty trucks.

In some embodiments, the active sites in the crystal lattice of the binary catalysts of the present disclosure can be populated with metal cations (e.g., $Cu^{2+}$ and $Fe^{3+}$) in amounts that are substantially higher than those achievable by equilibrium ion exchange, with little to no detectable increase in copper oxide formation. For example, as discussed above, in the case of copper loading, conventional methods require multiple equilibrium loading procedures to achieve >3 wt % Cu. In stark contrast, the methods of the present disclosure can result in metal cation loading of 3 wt % to 6 wt % (e.g., 4 wt % to 6 wt %, 5 wt % to 6 wt %, or 6 wt %) in the zeolite-based binary catalyst composition (e.g., CuSSZ13, HBC, i-CBC catalyst composition), with reaction completion within seconds to minutes.

Intra-Crystalline Binary Catalyst Synthesis

The intra-crystalline binary catalyst composition that is used for the metal cation loading can be made by providing a reaction mixture of zeolite precursors (e.g., silica, alumina), with an organic templating agent. The reaction mixture for making the intra-crystalline binary catalyst can further include one or more seed catalysts, such as a hybrid binary catalyst described in U.S. application Ser. No. 15/612,815 filed Jun. 2, 2017 and issued as U.S. Pat. No. 10,675,586 on Jun. 9, 2020 and in U.S. application Ser. No. 15/612,833, filed Jun. 2, 2017 which has been published as US Publication No. 2018/0345217 on Dec. 6, 2018 and allowed on Jul. 15, 2020, and precursors to the metal oxide.

A general example of the synthesis of intra-crystalline binary catalyst compositions is as follows:
1) Dissolve an amount of base, such as sodium hydroxide, in deionized water. Rapidly add a solution of a metal oxide precursor with vigorous stirring. The metal oxide nanoparticles can form instantly.
2) A templating agent can be added, followed by the reagents for the zeolite (e.g., alumina and fumed silica.
3) The contents were well mixed and transferred to a Teflon lined high pressure reactor, and incubated at 160° C. for the prescribed reaction time of between 168 to 336 hours.

A HBC can be added as a seeding agent. For example, the seeding HBC can include HBC containing Zr/Mo, Zr/Ce, Zr/Cr, Zr/W, Ce/La, Zr/Ba/La, and/or Zr/La.

In some examples, the incubation can occur at a temperature of 150° C. or more (e.g., 160° C. or more, or 165° C. or more) and/or 170° C. or less (e.g., 165° C. or less, or 160° C. or less) for a duration of 6 days or more (e.g., 10 days or more, 14 days or more, or 16 days or more) and/or 20 days or less (e.g., 16 days or less, 14 days or less, or 10 days or less) (each day is 24 hours). The synthesized intra-crystalline binary catalyst can then be isolated from the reaction mixture by filtration. The isolated intra-crystalline binary catalyst can be optionally air-dried, and calcined in air at 550° C. or more (e.g., 575° C. or more, or 600° C. or more) to 620° C. or less (e.g., 600° C. or less, or 575° C. or less) for a duration of 3 hours or more and/or 5 hours or less (e.g., a duration of about 4 hours). After calcining, the proton form of the intra-crystalline binary catalyst can be obtained by conducting an ammonium-ion exchange procedure, followed by calcining. The proton form of the intra-crystalline binary catalyst can be loaded with a metal cation by treating the zeolite with a solution containing the metal cation precursor (e.g., in the form of a metal salt) in the presence of a basic ammonia solution. Examples of metal cation precursor salts include copper nitrate, copper sulfate, ferric nitrate, tetraaminepalladium nitrate, tetraamineplatinum nitrate, rhodium nitrate hydrate, and any combination thereof.

The zeolite precursors can include, for example, silica ($SiO_2$), alumina ($Al_2O_3$), fumed silica, fumed alumina, silica gel, Rh on alumina, and/or ammonium hexafluorosilica. The reaction mixture can include a Si/Al ratio of 2 or more (e.g., 5 or more, 8 or more, 11 or more, 14 or more, or 16 or more) and/or 20 or less (e.g., 16 or less, 14 or less, 11 or less, 8 or less, or 5 or less). In some embodiments, the zeolite precursor includes silica and alumina at a weight ratio of 10:3 or more (e.g., 20:3 or more, 40:3 or more, 60:3 or more, or 80:3 or more) and/or 100:3 or less (e.g., 80:3 or less, 60:3 or less, 40:3 or less, or 20:3 or less). In some embodiments, the silica and alumina weight ratio is 50:5. The concentration of Si in the reaction mixture can be 20 wt % or more and/or 40 wt % or less (e.g., from 20 wt % to 40 wt %). The concentration of Al in the reaction mixture can be 3 wt % or more and/or 40 wt % or less (e.g., from 3 wt % to 40 wt %).

The reaction mixture can further include a solvent, such as water.

The organic templating agent includes, for example, trimethyladamantylammonium hydroxide, trimethyl-1-adamantylammonium iodide, copper tetraethylenepentamine, tricyclodecane, copper diethylenetriamine, N1-butyl-N4-docosyl-N1,N1,N4,N4-tetramethylbutane-1,4-diaminium dibromide, and/or 3-azoniabicyclo[3.2.1]octane. The organic templating agent can be present in the reaction mixture at a concentration of 10% or more and/or 30% or less.

The seed catalyst can be, for example, a hybrid binary catalyst having the same elements as the desired intra-crystalline binary catalyst composition. The seed catalyst can be present in the reaction mixture at a concentration of 0.5 wt % or more (e.g., 1 wt % or more, 1.5 wt % or more, 5 wt % or more, 10 wt % or more, 15 wt % or more, 20 wt % or more, 30 wt % or more) and/or 40 wt % or less (e.g., 30 wt % or less, 20 wt % or less, 15 wt % or less, 10 wt % or less, 5 wt % or less, 1.5 wt % or less, or 1 wt % or less).

The metal oxide precursors can include, for example zirconium oxychloride octahydrate, zirconium oxynitrate hydrate, yttrium chloride, barium nitrate, ferric nitrate, hexammine cobalt (III) chloride, and/or hexammine cobalt (III) chloride. The metal oxide precursors can be present in the reaction mixture at a concentration of 1 wt % or more (e.g., 3 wt % or more, 5 wt % or more, 7.5 wt % or more) and/or 10 wt % or less (e.g., 7.5 wt % or less, 5 wt % or less, or 3 wt % or less).

In some embodiments, formation of zeolite (e.g., SSZ-13) in a reaction mixture for making the intra-crystalline binary catalyst includes an organic templating agent to guide the correct assembly of the Si and Al components of zeolite (e.g., chabazite) framework. An example templating agent is trimethyladamantylammonium hydroxide (TMA). To provide a more rapid reaction, the temperature for the synthesis can be raised. However, at elevated reaction temperatures (e.g., above about 160° C.) in zeolite synthesis, the templating agent can break down, leading to growth of competing denser zeolite phases that are thermodynamically more stable than the desired zeolite phase at higher temperatures. For example, in the synthesis of SSZ-13, formation of denser analcime or quartz can occur at elevated temperatures. An alternative option to elevated temperature to shorten the synthesis time is to add seed crystals of an existing zeolite. Addition of seed crystals can speed up crystallization and/or direct the zeolite crystal growth to a particular structure. Therefore, in some embodiments, the synthesis of the intra-crystalline binary catalyst includes seeding a reaction mixture with a hybrid binary catalyst (e.g., a SSZ-13 based hybrid binary catalyst) to provide preformed catalyst nanoparticles that allow for favorable kinetics for zeolite (e.g., chabazite) structure formation.

To provide a proton form of a silica-rich zeolite component of the intra-crystalline catalyst, such as the SSZ-13-based zeolite, a sodium form of the zeolite is first ion exchanged to the ammonium form. In an exemplary synthetic procedure, 1 gram of the intra-crystalline catalyst is suspended in 100 ml of 1 M $NH_4NO_3$ solution. The solution is subsequently stirred at 80° C. for 2 hours after which the solid product is recovered by filtration and washed with copious amounts of deionized water. After drying the product, the ammonium ($NH_4+$) exchange procedure is repeated two or three more times, washed with deionized water and air dried to 8-12 hours. The $NH_4$-intra-crystalline catalyst converts to the H-intra-crystalline catalyst by calcination with a temperature ramp of 2° C./min to 600° C. in air, which is then held constant for 4 hours.

Metal Cation-Loaded Catalyst Structure

When the metal cation loading procedure generates metal cation-loaded hybrid binary catalysts (HBCs), the HBCs include a primary catalyst that can be a highly porous particle and a secondary catalyst. The secondary catalyst coats the surfaces (e.g., the internal porous surface and/or the external surface) of the primary catalyst. The syntheses described herein of the metal cation-loaded HBCs provide a primary catalyst whose entire surface, or portions thereof, are coated with discrete and identifiable crystals of the secondary catalyst. The crystals can have a maximum dimension of from 1 to 5 nm. Hybrid binary catalysts are also described, for example, in U.S. application Ser. No. 15/612,815 which has been published as US Publication No. 2018/0345217 on Dec. 6, 2018 and allowed on Jul. 15, 2020 and in U.S. application Ser. No. 15/612,833, filed Jun. 2, 2017 which has been published as US Publication No. 2018/0345217 on Dec. 6, 2018 and allowed on Jul. 15, 2020, each of which is incorporated herein by reference in its entirety.

When intra-crystalline binary catalysts are used for metal cation loading using the procedures of the present disclosure, the metal cation-loaded intra-crystalline binary catalyst compositions can have metal cations loaded into a binary catalyst composition having a primary catalyst's crystal lattice (e.g., a zeolite's crystal lattice) that incorporates a secondary catalyst (e.g., a metal oxide), wherein the secondary catalyst is covalently bound to elements within the crystal lattice of the primary catalyst. This binary catalyst composition, prior to loading with a metal cation, is referred to herein as an intra-crystalline binary catalyst (i-CBC). In an intra-crystalline binary catalyst, the secondary catalyst forms an integral part of the primary catalyst's crystal lattice, forming covalent bonds with at least the Si or Al atoms within the crystal lattice of the primary catalyst, and is dispersed throughout the primary catalyst's crystal lattice. The secondary catalyst can substitute atoms within the crystal lattice of the primary catalyst. Intra-crystalline binary catalysts (i-CBC), are also described in concurrently filed U.S. application Ser. No. 16/377,035 which has been published as US Publication No. 2020/0316571 on Oct. 8, 2020 and allowed on Sep. 30, 2020, and entitled "Intra-Crystalline Binary Catalysts and Uses Thereof," the disclosure of which is herein incorporated in its entirety.

The metal cation-loaded binary catalyst compositions, whether intra-crystalline or hybrid in nature, can include specific chemical elements that possess the desired electronegativities for various chemical reactions that occur in an engine aftertreatment system. Table A shows a list of suitable elements with desirable electronegativity values that can be used in the binary catalyst compositions, as well as the oxidation states of these elements that can be present in the binary catalyst compositions. In some embodiments, the binary catalyst compositions include Ba (barium), Cu (copper), Co (cobalt), Zr (zirconium), Nb (niobium), Mo (molybdenum), Ti (titanium), W (tungsten), La (lanthanum), and/or Fe (iron).

TABLE A

Electronegativity and oxidation states of selected elements from the periodic table.

| Period | Group | Element | Electronegativity (Paulings) | Oxidation State |
|---|---|---|---|---|
| 4 | Alkaline earth | Ca | 1 | $1^+, 2^+$ |
| 5 | Alkaline earth | Sr | 0.95 | $2^+$ |
| 6 | Alkaline earth | Ba | 0.89 | $1^+, 2^+$ |
| 3 | 3A | Al | 1.61 | $1^+, 2^+, 3^+, [1^-, 2^-, 3^-]$ |
|  | 4A | Si | 1.90 | $1^+, 2^+, 3^+, 4^+, [1^-, 2^-, 3^-, 4^-]$ |
| 4 | Transition metal | Sc | 1.36 | $1^+, 2^+, 3^+$ |
|  | Transition metal | Ti | 1.54 | $2^+, 3^+, 4^+ [1^-, 2^-]$ |
|  | Transition metal | V | 1.63 | $2^+, 3^+, 4^+, 5^+ [3^-]$ |
|  | Transition metal | Cr | 1.66 | $1^+, 2^+, 3^+, 4^+, 5^+, 6^+ [1^-, 2^-, 4^-]$ |
|  | Transition metal | Mn | 1.56 | $2^+, 3^+, 4^+, 5^+, 6^+, 7^+ [1^-, 2^-, 3^-]$ |
|  | Transition metal | Fe | 1.83 | $2^+, 3^+, 4^+, 5^+, 6^+ [1^-, 2^-, 4^-]$ |
|  | Transition metal | Co | 1.88 | $2^+, 3^+, 4^+, 5^+ [3^-]$ |
|  | Transition metal | Ni | 1.91 | $2^+, 3^+, 4^+ [1^-, 2^+]$ |
|  | Transition metal | Cu | 1.9 | $1^+, 2^+, 3^+, 4^+ [2^-]$ |
|  | Transition metal | Zn | 1.65 | $1^+, 2^+ [0, 2^-]$ |
| 5 | Transition metal | Y | 1.22 | $1^+, 2^+, 3^+$ |
|  | Transition metal | Zr | 1.33 | $1^+, 2^+, 3^+, 4^+ [2^-]$ |
|  | Transition metal | Nb | 1.6 | $1^+, 2^+, 3^+, 4^+, 5^+ [1^-, 3^-]$ |
|  | Transition metal | Mo | 2.16 | $1^+, 2^+, 3^+, 4^+, 5^+, 6^+ [0, 1^-, 2^-, 4^-]$ |
|  | Transition metal | W | 1.7 | $1^+, 2^+, 3^+, 4^+, 5^+, 6^+ [0, 1^-, 2^-, 4^-]$ |
| 6 | Lanthanide | Ce | 1.12 | $1^+, 2^+, 3^+, 4^+$ |
| 6 | Lanthanide | La | 1.1 | $1^+, 2^+, 3^+$ |

The binary catalyst compositions of the present disclosure can provide one or more of the following benefits:
i. The binary catalyst compositions include a refractory metal oxide that is abundant and relatively low cost, durable and with relatively low oxidative power (e.g., $ZrO_2$).

ii. The binary catalyst compositions can have dopants to create oxygen vacancies in the crystal lattice of the metal oxide (e.g., zirconium dioxide). The dopants (e.g., $Ba^{2+}$, $Ca^{2+}$, or $Sr^{2+}$) are relatively low in cost and have reductive power that can counterbalance the oxidative power of the metal oxide, while positively impacting $NO_x$ storage.

iii. The binary catalyst compositions incorporate selected high oxidative power species (e.g., Ti, Co, Cr, Mn, Nb, V, Mo, and/or W-containing oxides) into a mixed metal oxide structure, to tailor the final oxidative power according to a specific application. The high oxidative power species can be employed in different oxidation states as needed. For example, a species having high oxidative power (1.5-2.2 Paulings) is useful for DOC applications, while a species having relatively moderate (1 to <1.5 Paulings) to low oxidative power (<1.0 Paulings) is useful for high durability SCR applications. One major exception is cerium (a lanthanide element), with electronegativity that falls in the moderate range but is also very effective for DOC application.

Some considerations for the oxidative properties of the binary catalyst compositions include:

i. without wishing to be bound by theory, it is believed that the oxidative power of the final (zirconia doped) mixed oxide is important, therefore elements with high Pauling values can be used in SCR applications at relatively low doping levels. At higher doping levels, the same element can be highly effective in DOC applications.

ii. without wishing to be bound by theory, it is believed that the valency of the element plays an important role in the observed oxidative power. Therefore, selection of an element having a low valence state (e.g., 2+, such as $Co^{2+}$) as a dopant in $ZrO_2$ can be useful in SCR application, while an element having high valence (≥3+) can be more preferred in DOC applications.

The binary catalyst compositions can incorporate acidic (i.e., anionic) groups, such as $VO_4^{3-}$ in zirconium vanadate, $ZrO_3^{2-}$ in barium zirconate, and/or $Mo_7^{6-}$ in zirconium molybdate, which facilitate high binding capacity for cations that provide catalytic activity in emissions control. For example, $Cu^{2+}$ and/or $Fe^{2+}$ can be used for $NO_x$ reduction; and $Pt^{2+}/Pt^0$, other platinum-group metals (PGMs) and certain base metals (e.g., $Ni^{2+}$ and $Fe^{3+}$) can facilitate oxidative reactions required for DOC and AMOX catalysts.

Without wishing to be bound by theory, it is believed that the primary catalyst and the well-dispersed secondary catalysts can act in synergy with respect to one another when catalyzing the decomposition of exhaust gases, where the primary and secondary catalysts can both participate in a redox reaction, with one catalyst acting as a reducing agent (e.g., an anode) and the other catalyst acting as an oxidizing agent (e.g., a cathode). The redox reaction is a spontaneous and self-perpetuating process that occurs at adjacent active sites, where mass transfer limitations are minimal due to the close proximity of the active sites in a crystal lattice. The catalyst components can be selected to possess ion exchange/binding properties to enable ion transport between sites. For example, doping of $ZrO_2$ with $Y^{3+}$ cationic dopant creates lattice vacancies that permit $O^{2-}$ transport through the zeolite crystal lattice. On the other hand, dopants such as $Ba^{2+}$ can create lattice vacancies (e.g., in $BaZrO_3$) that permit cation binding, and hence transport of cations (e.g., $H_3O^+$) between reduction/oxidation sites in the crystal lattice.

In some embodiments, the binary catalyst compositions of the present disclosure have a primary catalyst that includes one or more zeolites. In some embodiments, the zeolite is an aluminosilicate zeolite. In some embodiments, the one or more zeolites further include a cation such as $Pt^{2+}$, $Pd^{2+}$, $Rh^{2+}$, $Cu^{2+}$, $Ni^{2+}$, and/or $Fe^{3+}$ in the zeolite active sites. In certain embodiments, the zeolite also includes an alkali metal ion such as $Na^+$ and $K^+$ in the zeolite active sites to effectively neutralize (or cap) residual acid sites in the zeolite after loading with the desired catalytic metal ion. In some embodiments, the metal cation-loaded binary catalysts of the present disclosure are substantially free of alkali metal ions, such as $Na^+$ and $K^+$.

In some embodiments, the binary catalyst composition can be a metal cation-loaded hybrid binary catalyst, or a metal cation-loaded intra-crystalline binary catalyst having a structure shown in FIG. 2D, where a combination of a hybrid binary catalyst and an intra-crystalline binary catalyst composition has metal oxide nanoparticles covalently attached to the surface of the metal zeolite particles and metal oxide nanoparticles also covalently bound throughout the crystal lattice of the metal zeolite's crystal framework. In this scenario, the cation-loaded binary catalyst compositions can include from 0.5 wt % (e.g., from 1 wt %, from 10 wt %, from 20 wt %, from 30 wt %, from 40 wt %, from 50 wt %, from 60 wt %, from 70 wt %, from 80 wt %, from 85 wt %, from 90 wt %, from 95 wt %, from 97.5 wt %, from 98 wt %, from 98.5 wt %, from 99 wt %, from 99.5 wt %) to 99.9 wt % (e.g., to 99.5 wt %, to 99 wt %, to 98.5 wt %, to 98 wt %, to 97.5 wt %, to 95 wt %, to 90 wt %, to 80 wt %, to 70 wt %, to 60 wt %, to 50 wt %, to 40 wt %, to 30 wt %, to 20 wt %, to 10 wt %, or to 1 wt %) of the one or more metal zeolites. In certain embodiments, the binary catalyst compositions can include from 10 wt % to 50 wt % (e.g., from 20 wt % to 40 wt %, from 30 wt % to 50 wt %, or about 30 wt %) of the one or more metal zeolites. As used here, "metal zeolite" refers to a zeolite that has been loaded with Cu or Fe cations.

In certain embodiments, the metal cation-loaded intra-crystalline binary catalyst compositions include from 90 wt % to 99.9 wt % (e.g., from 95 wt % to 99.9 wt %, from 97.5 wt % to 99.9 wt %, from 98 wt % to 99.9 wt %, from 99 wt % to 99.9 wt %, from 99.5 wt % to 99.9 wt %, from 95 wt % to 99 wt %, from 97.5 wt % to 99 wt %, or from 98 wt % to 99 wt %) of the one or more metal zeolites. The intra-crystalline binary catalyst can have a structure shown in FIG. 2C, where nanoparticles of metal oxides are covalently incorporated into and throughout the crystal lattice of metal zeolite.

In some embodiments, the metal zeolite of the metal cation-loaded binary catalyst composition of the present disclosure, whether intra-crystalline or hybrid in nature, is a Fe-loaded aluminosilicate zeolite, a Cu-loaded aluminosilicate zeolite, and/or a Fe- and Cu-loaded aluminosilicate zeolite. In certain embodiments, the metal zeolite is a Fe-loaded chabazite, a Cu-loaded chabazite, and/or a Fe and Cu-loaded chabazite. In certain embodiments, the metal zeolite is a Fe- and/or Cu-loaded aluminosilicate zeolite. In some embodiments, the metal zeolite includes SSZ-13 chabazite, other aluminosilicate zeolites having SSZ-type zeolite structures, ZSM-5, and/or β-zeolite. In certain embodiments, the metal zeolite includes a chabazite. In certain embodiments, the metal zeolite includes ZSM-5 or β-zeolite. In certain embodiments, the metal zeolite includes SSZ-13 and/or other thermally durable zeolites.

When in the form of an intra-crystalline binary catalyst, the metal zeolite can have a Si/Al ratio of 2 or more (e.g., 4 or more, 6 or more, 8 or more, 10 or more, 12 or more, 15 or more, or 20 or more) and/or 25 or less (e.g., 20 or less, 15 or less, 12 or less, 10 or less, 8 or less, 6 or less, or 4 or less). In some embodiments, the zeolite or the metal zeolite has a Si/Al ratio of from 2 to 12 (e.g., from 2 to 10, from 2 to 8, from 6 to 12, from 6 to 10, or from 8 to 10). The Si/Al ratio can provide an intra-crystalline binary catalyst with good durability.

To assess the durability of a binary catalyst composition, a low temperature catalyst aging test can be performed. For the test, 10 g of a SCR catalyst powder can be mixed with 28% $NH_3$ solution, placed in a Teflon lined high pressure rated reactor, and incubated for 30 hours at 160° C. The catalyst can then be washed and dried, and XRD profiles can be compared before and after treatment. If the binary catalyst composition is stable, the XRD results can show little change in structure. In some embodiments, the hydrothermal aging test can be conducted at 800° C. for 16 hours, and the XRD profiles can be compared before and after treatment.

In certain embodiments, the binary catalyst compositions (e.g., when hybrid binary in nature) can be highly mesoporous, having a porosity of greater than or equal to 0.3 $cm^3/g$ (e.g., greater than 0.33 $cm^3/g$, greater than 0.35 $cm^3/g$, greater than 0.4 $cm^3/g$, or greater than 0.5 $cm^3/g$) and/or less than or equal to 0.6 $cm^3/g$ (less than or equal to 0.5 $cm^3/g$, less than or equal to 0.4 $cm^3/g$, less than or equal to 0.35 $cm^3/g$, or less than or equal to 0.33 $cm^3/g$). The porosity of binary catalyst composition can be determined by BET surface area measurement.

As discussed above, the binary catalyst composition can be a metal cation-loaded hybrid binary catalyst, or an intra-crystalline binary catalyst having a structure shown in FIG. 2D, where a combination of a hybrid binary catalyst and an intra-crystalline binary catalyst composition has metal oxide nanoparticles covalently attached to the surface of the metal zeolite particles and metal oxide nanoparticles also covalently bound throughout the crystal lattice of the metal zeolite's crystal framework. In this scenario, the binary catalyst composition can have a secondary catalyst that includes one or more metal oxides. The metal oxides can be in the form of nanoparticles, having a maximum dimension of from 0.1 nm (e.g., from 1 nm, from 5 nm, from 10 nm, from 20 nm, from 30 nm, or from 40 nm) to 50 nm (e.g., to 40 nm, to 30 nm, to 20 nm, to 10 nm, to 5 nm, or to 1 nm). In certain embodiments, the metal oxides in the form of nanoparticles have a maximum dimension of from 1 nm to 5 nm (e.g., from 1 nm to 4 nm, from 2 nm to 5 nm, from 3 nm to 5 nm; about 3 nm).

When in the form of an intra-crystalline binary catalyst composition having, for example, the structure shown in FIG. 2C, the binary catalyst compositions can have a secondary catalyst that includes one or more metal oxides. The metal oxides can be in the form of nanoparticles, having a maximum dimension of from 0.1 nm (e.g., from 0.5 nm, from 1 nm, from 2 nm, from 3 nm, or from 4 nm) to 5 nm (e.g., to 4 nm, to 3 nm, to 2 nm, to 1 nm, or to 0.5 nm). In certain embodiments, the metal oxides in the form of nanoparticles have a maximum dimension of from 1 nm to 5 nm (e.g., from 1 nm to 4 nm, from 2 nm to 5 nm, from 3 nm to 5 nm; about 3 nm). The secondary catalyst can be imaged via electron microscopy, and can be discrete nanoparticles dispersed throughout the crystal lattice of the primary catalyst. The secondary catalyst can be covalently bound to the zeolite's crystal lattice. In some embodiments, the secondary catalyst occupies the sites corresponding to aluminum in the metal zeolite's crystal lattice.

The one or more metal oxides of the secondary catalyst of the binary catalyst compositions, whether intra-crystalline or hybrid in nature, can include, for example, lanthanum oxide, cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, platinum oxide, palladium oxide, iridium oxide, nickel oxide, barium oxide, yttrium oxide, scandium oxide, calcium oxide, ferric oxide, manganese oxide, lanthanum oxide, strontium oxide, cobalt oxide, copper oxide, iron oxide, and/or any combination thereof. In some embodiments, the one or more metal oxides of the intra-crystalline binary catalyst compositions are zirconium oxide, vanadium oxide, cerium oxide, manganese oxide, chromium oxide, cobalt oxide, titanium oxide, tungsten oxide, barium oxide, and/or any combination thereof. In certain embodiments, the one or more metal oxides of the binary catalyst compositions include zirconia, ceria, vanadia, chromium oxide, barium oxide, and/or niobium oxide. In some embodiments, the one or more metal oxides of the binary catalyst compositions include lanthanum oxide, strontium oxide, cobalt oxide, and/or iron oxide.

As discussed above, the binary catalyst composition can be a metal cation-loaded hybrid binary catalyst, or an intra-crystalline binary catalyst having a structure shown in FIG. 2D. In this scenario, In some embodiments, the binary catalyst compositions can have from 0.5 wt % (e.g., from 1 wt %, from 10 wt %, from 20 wt %, from 30 wt %, from 40 wt %, from 50 wt %, from 60 wt %, from 70 wt %, from 80 wt %, or from 90 wt %) to 99.5 wt % (e.g., to 90 wt %, to 80 wt %, to 70 wt %, to 60 wt %, to 50 wt %, to 40 wt %, to 30 wt %, to 20 wt %, to 10 wt %, or to 1 wt %) of the one or more metal oxide secondary catalysts. As used herein, a recited ranges includes the end points, such that from 0.5 wt % to 99.5 wt % includes both 0.5 wt % and 99.5 wt %.

In certain embodiments, the intra-crystalline binary catalyst compositions having, for example, the structure shown in FIG. 2C, the binary catalyst compositions can include 0.05 wt % or more (e.g., 0.1 wt % or more, 0.5 wt % or more, 1 wt % or more, 1.5 wt % or more, 3 wt % or more, or 4 wt % or more) and/or 5 wt % or less (e.g., 4 wt % or less, 3 wt % or less, 1.5 wt % or less, 1 wt % or less, 0.5 wt % or less, or 0.1 wt % or less) of the secondary catalyst that includes one or more metal oxides. In certain embodiments, the intra-crystalline binary catalyst compositions include 0.05 wt % or more (e.g., 0.1 wt % or more, 0.5 wt % or more, 1 wt % or more, 1.5 wt % or more, or 1.75 wt % or more) and/or 2 wt % or less (e.g., 1.75 wt % or less, 1.5 wt % or less, 1 wt % or less, 0.5 wt % or less, or 0.1 wt % or less) of the secondary catalyst that includes one or more metal oxides. In some embodiments, the intra-crystalline binary catalyst compositions include from 0.05 wt % to 2 wt % (e.g., 0.1 to 2 wt %, 0.1 to 1.75 wt %, 0.1 to 1.5 wt %, 0.1 to 1 wt %, 0.1 to 0.5 wt %, 0.25 wt % to 2 wt %, 0.5 wt % to 2 wt %, 0.75 wt % to 2 wt %, 1.0 wt % to 2 wt %, 1.25 wt % to 2 wt %, or 1.5 wt % to 2 wt %) of the secondary catalyst that includes one or more metal oxides.

In some embodiments, the binary catalyst compositions, whether intra-crystalline or hybrid in nature, further include a cationic dopant. The cationic dopant can be located in the secondary catalyst. In some embodiments, the cationic dopant is found in the secondary catalyst, but not in the primary catalyst. For example, the binary catalyst compositions can include a cation of Ca, Mg, Sc, Y, Tc, Ag, Cd, In, Sn, Hf, Re, Os, Ir, Au, Tl, Pr, Nd, Cu, Ni, Ti, V, Nb, Ta, Cr, Zr, Mo, W, Mn, Fe, Zn, Ga, Al, In, Ge, Si, Co, Ba, La, Ce, Nb, Sr, Pt, Pd, Rh, and any combination thereof. In some embodiments, the cationic dopant can include an oxide that includes $Ca^{2+}$, $Mg^{2+}$, $Sc^{3+}$, $Y^{3+}$, $Tc^{7+}$, $Ag^+$, $Cd^{2+}$, $In^{3+}$, $Sn^{2+}$, $Hf^{4+}$, $Re^{4+}$, $Os^{4+}$, $Ir^{4+}$, $Ir^{3+}$, $Au^{3+}$, $Tl^{3+}$, $Pr^{3+}$, $Nd^{3+}$, $Cu^{2+}$, $Cu^{2+}$, $Ni^{2+}$, $Ti^{4+}$, $V^{4+}$, $Nb^{4+}$, $Ta^{5+}$, $Cr^{3+}$, $Zr^{4+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, $Nb^{5+}$, $Sr^{2+}$, $Pt^{2+}$, $Pd^{2+}$, $Rh^{2+}$, and any combination thereof. In certain embodiments, the cationic dopant is an oxide that includes $Pt^{2+}$, $Pd^{2+}$, and/or $Rh^{2+}$.

In certain embodiments, the binary catalyst compositions include a metal cation of one or more of the following elements: Ca, Sr, Ba, Sc, Ti, V, Cr, Mn, Fe, Co, Ni, Cu, Zn, Y, Zr, Nb, Mo, W, La, Ce, Pd, and/or Rh, which can be in the form of an oxide, and/or in the form of dopants in the binary catalyst compositions. As discussed above, the cationic dopant can be located in the secondary catalyst. In some embodiments, the cationic dopant is found in the secondary catalyst, but not in the primary catalyst. In some embodiments, when in the form of dopants, the dopant cation is achieved by incipient wetness impregnation and is bound by the anion exchange characteristics of the metal oxide. In some embodiments, one or more metal oxides of the secondary catalysts of the binary catalyst compositions include a cation of one or more of Ba, Co, Fe, Zr, Pd, and/or Rh. The cationic dopant can be present in the binary catalyst composition at a concentration of 0.01 wt % or more (e.g., 0.1 wt % or more, 1 wt % or more, 2 wt % or more, 3 wt % or more, 4 wt % or more, 5 wt % or more, or 6 wt % or more) and/or 7 wt % or less (e.g., 6 wt % or less, 5 wt % or less, 4 wt % or less, 3 wt % or less, 2 wt % or less, 1 wt % or less, or 0.1 wt % or less), relative to the whole of the binary catalyst composition. In some embodiments, the cationic dopant is present at a concentration of 0.01 wt % or more (e.g., 0.1 wt % or more, 0.5 wt % or more, 1 wt % or more, 1.5 wt % or more, or 1.75 wt % or more) and/or 2 wt % or less (e.g., 1.75 wt % or less, 1.5 wt % or less, 1 wt % or less, 0.5 wt % or less, or 0.1 wt % or less), relative to the whole of the binary catalyst composition.

The binary catalyst compositions of the present disclosure, whether intra-crystalline or hybrid in nature, provide flexibility in their compositions. For example, the composition can be changed by adjusting an oxidative power to address the tradeoff between $NO_x$ reduction performance and durability. In some embodiments, the optimal composition can be determined for each metal oxide system. In some embodiments, the one or more metal oxides of the secondary catalyst of the binary catalyst compositions are $CeO_2:ZrO_2$ (i.e., a mixture of $CeO_2$ and $ZrO_2$ having, for example, from 40 wt % to 60 wt % $CeO_2$, $Y_2O_3:CeO_2$ (i.e., a mixture of $Y_2O_3$ and $CeO_2$, where, in some embodiments, has about 10 wt % of $Y_2O_3$), $BaZrO_3$, $Zr_{0.8}Sr_{0.2}CoO_3$, $Zr_{0.9}Ca_{0.1}O_x$ where x is an amount of 0 that counterbalances the Zr and Ca cations of the composition, $Zr_{0.5}Ba_{0.5}Mn_3O_4$, $Ba_{0.3}Zr_{0.7}O_x$ ($Ba_{0.3}Zr_{0.7}$ oxide) where x is an amount of 0 that counterbalances the Ba and Zr cations of the composition, $Zr_{0.5}Ba_{0.5}CrO_3$, $Zr_{0.5}Ba_{0.5}CoO_x$ (including higher oxidation states of cobalt oxide) where x is an amount of 0 that counterbalances the Zr, Ba, and Co cations of the composition, Zr oxides (e.g., $ZrO_2$), $TiO_2:CeO_2$ (i.e., a mixture of $TiO_2$ and $CeO_2$), $Y_2O_3:ZrO_2$, $ZrV_2O_7$, $Zr_{0.3}Ba_{0.1}V_{0.6}O_x$ where x is an amount of 0 that counterbalances Zr, Ba, and V, $TiO_2:ZrV_2O_7$, each optionally including a cationic dopant that is an oxide that includes $Ba^{2+}$, $Pt^{2+}$, $Pd^{2+}$, $Rh^{2+}$, $Ru^{2+}$, $Cu^{2+}$, $Ni^{2+}$, and $Fe^{3+}$. In some embodiments, the metal oxide of the secondary catalyst in the binary catalyst compositions is $ZrO_2$, $Y_2O_3:ZrO_2$, $ZrV_2O_7$, $Zr_{0.3}Ba_{0.1}V_{0.6}O_x$ where x is an amount of 0 that counterbalances the Zr, Ba, and V cations of the composition, $Zr_{0.7}Ti_{0.3}VO_x$ where x is an amount of 0 that counterbalances the Z, Ti, and V cations of the composition, $Zr_{0.7}Ba_{0.3}$ oxide, and/or $CeO_2:ZrO_2$. In certain embodiments, while $CeO_2$ has higher oxidative power, $ZrO_2$ is selected instead as the secondary catalyst based upon both durability consideration and its ability to be modified by doping with strong oxidizing species (such as $Mn_3O_4$, $CoO_3$, $V_2O_7$, $CrO_3$, $WO_2$, $MoO_2$, NiO, $Fe_3O_4$, $(HPO_4)^{2-}$, any combination thereof, and the like), in addition to modifiers such as BaO, which can enhance $NO_x$ storage.

In some embodiments, the binary catalyst compositions do not include a cationic dopant. In some embodiments, the binary catalyst composition consists of a metal zeolite including metal oxide and a cationic dopant. In certain embodiments, the binary catalyst composition consists of a metal zeolite and a metal oxide. In some embodiments, the one or more metal oxides do not include a cationic dopant. In some embodiments, the secondary catalyst consists of a metal oxide including a cationic dopant. In certain embodiments, the secondary catalyst consists of a metal oxide.

The binary catalyst compositions of the present disclosure can have a variety of desirable properties. For example, the intra-crystalline binary catalyst compositions can have a thermal resistance of up to 600° C. As used herein, "thermal resistance" refers to the ability of a catalyst to retain catalytic activity even with repeated exposure of up to 600° C. over an extended period of time (e.g., 100 hours or more). In some embodiments, a standard accelerated aging test includes hydrothermal aging studies at 800° C. for 16 hours in 8% water vapor.

As discussed above, the binary catalyst composition can be a metal cation-loaded hybrid binary catalyst, or an intra-crystalline binary catalyst having a structure shown in FIG. 2D. In this scenario, the metal cation-loaded binary catalyst compositions can have a BET surface area of at least 200 m$^2$/g (e.g., at least 300 m$^2$/g, at least 400 m$^2$/g, or at least 500 m$^2$/g). In some embodiments, the intra-crystalline binary catalyst compositions of the present disclosure having, for example, the structure shown in FIG. 2C, can have a BET surface area of 450 m$^2$/g or more (e.g., 500 m$^2$/g or more, 550 m$^2$/g or more, or 600 m$^2$/g or more) and/or 650 m$^2$/g or less (e.g., 600 m$^2$/g or less, 550 m$^2$/g or less, or 500 m$^2$/g or less). In some embodiments, the intra-crystalline binary catalyst compositions have a BET surface area of 500±50 m$^2$/g. In some embodiments, the intra-crystalline binary catalyst compositions can have a median pore diameter of about 5-6 Å. The pore diameter can be obtained by BET measurements. Without wishing to be bound by theory, it is believed that intra-crystalline binary catalyst compositions with a large BET surface area has greater catalytic activity compared to an intra-crystalline binary catalyst composition with a smaller BET surface area.

In some embodiments, the metal cation-loaded intra-crystalline binary catalyst compositions have increased catalytic activity compared to a corresponding metal cation-loaded hybrid binary catalyst or a physical mixture of primary and secondary catalysts.

The following examples are provided to illustrate, not limit, the disclosure.

EXAMPLES

Nomenclature

Zeolites
   SSZ-13, or SSZ13: Chabazite

ZSM-5
β: beta zeolite
Metal Oxides
    Z: Zirconium dioxide ($ZrO_2$)
    ZB: Barium zirconate
    ZV: Zirconium vanadate (or related compounds)
    B: Barium oxide
    Co: Cobalt (oxide)
    Mn: Manganese (oxide)
    CZ: Ceria-zirconia (also shown as ZCe)
    Cr: Chromium (oxide)
    Ca: Calcium
General Metal Cation Loading Procedure
    The procedure includes the following steps:
    i. Metal oxide precursor reagents (Sigma-Aldrich) and metal salt precursor(s) (Sigma-Aldrich) are dissolved in deionized (DI water), in the appropriate proportions.
    ii. Heat is applied, and vigorously stirring.
    iii. At the predetermined reaction temperature, add a quantity of 28% $NH_3$ solution (Sigma-Aldrich). Metal cation loading occurs instantaneously, while the relatively high $NH_3$ concentration enables metal oxides (such as CuO) to remain in a soluble form. Optionally, continued vigorous stirring and applied heat for selected number minutes permit maximum metal cation loading under the prevailing conditions.
    iv. The product is cooled in an ice bath, filtered, followed by extensive washing with DI water. This optionally includes washing with a quantity of acidified DI water.
    v. Metal cation-loaded catalyst is dried at room temperature for at least 8-12 hours at room temperature (RT), followed by drying at 80° C.
    vi. The final step is calcining for 1-4 hours at 600° C.

Example 1: Ammonia Facilitated Copper Exchange of SSZ-13

A mixture of 25 g of SSZ-13 powder (ACS Materials), various amounts of anhydrous $CuSO_4$, and 150 mL DI water was heated to 80° C., then 50 mL 28% $NH_3$ solution was rapidly added. The recovered product was filtered; 2 Liters DI water wash; and optionally, 400 mL pH=3 acidified DI water wash was carried out; followed by a 2 Liters DI water wash. the catalyst was dried at room temperature for at least 8-12 hours, and then calcined for 4 hours at 600° C.

The following is the composition of the synthetic gas stream used: 500 ppm NOx ($NO_2$/NOx=0.0, 0.5, and 0.75); $O_2$ 8.7%; $H_2O$ 7.8% ($O_2/H_2O$ ratio of 1.1); ammonia to NOx=1.2; 500 ppm $NH_3$, all at a SV 100 $khr^{-1}$ space velocity. For $NH_3$ storage the gas stream comprised 500 ppm $NH_3$ with 8% $H_2O$ at space velocity (SV) 100 $khr^{-1}$, and the temperature ramped up to 480° C. while monitoring the amount of ammonia desorbed. When testing the standard $NO_x$ reduction reaction, $NO_2$ was not included in the simulated gas stream.

$NO_x$ reduction for the catalysts were determined by applying the catalysts to a 65% porosity (1"×3") SiC DPF core (Dinex) and testing on a synthetic gas bench in the following gas stream:

The results in Table 1 shows the very high copper exchange that was achievable with rapidly adding a concentrated ammonia solution, and the resulting catalysts exhibit peak $N_2O$ of 13-15 ppm, at 200° C. and equal amounts of $NO_2$ and NOx in the synthetic exhaust stream.

TABLE 1

Effect of Copper Solution Concentration on SSZ-13 Copper Loading

| Sample # | Al | Si | Cu | $CuSO_4$ (molar concentration) | 28% $NH_3$ solution (mL) |
|---|---|---|---|---|---|
| 1 | 4.1 | 35.4 | 3.3 | 0.17M | 50 |
| 2 | 3.8 | 34.5 | 3.3 | 0.17M | 50 |

FIGS. 4A and 4B contrast the synthetic procedures for conventional (FIG. 4A) and the $NH_3$ facilitated copper loading process (FIG. 4B) of the present disclosure. As can be seen in FIG. 4B, the $NH_3$ facilitated copper loading process of the present disclosure is much quicker and simpler to carry out.

Example 2: One-Pot Ammonia Facilitated Copper Exchange and Hybrid Binary Catalyst Synthesis Catalyst Synthesis Example 2 is a modification of the procedure described in Example 1 for copper exchange, where the precursors for metal oxide nanoparticle formation were included in the previously described mixture prior to the addition of ammonia solution. The following metal oxide precursors were employed: 3.125 g zirconium oxy chloride octahydrate, 5 g barium nitrate, 0.4 g yttrium chloride and 1 g urea. The rapid attainment of pH ≥10 results in simultaneous formation/hybridization of metal oxide nanoparticles on the SSZ-13 crystals, as a form of facilitated process rapidly transports $Cu^{2+}$ ions into the catalytic sites of the zeolite framework. Likewise, copper also incorporated into the metal oxide as a dopant in this process. Recovery, calcining and testing of these products were conducted as described in Example 1.

Results from ICP analysis of the catalysts produced are shown in Table 2. A wide range of copper loading has been achieved in a single (rapid) procedure by varying the copper concentration in the mixture. Greater than 4 wt % of copper was achieved with no evidence of CuO formation and peak $N_2O$ in the 1-15 ppm range at 200° C. (when equal amounts of $NO_2$ and NOx were in the simulated exhaust stream).

TABLE 2

Effect of Copper Solution Concentration on Simultaneous HBC Synthesis and Catalyst Loading

| Sample # | Ba | Al | Zr | Y | Cu | Si | CuSO4 (Molar Conc) | 28% $NH_3$ Solution (mL) |
|---|---|---|---|---|---|---|---|---|
| 1 | 7.8 | 2.9 | 2.5 | 0.99 | 4.1 | 27.2 | 0.38 | 50 |
| 2 | 8.4 | 3.2 | 2.7 | 0.55 | 2.1 | 29.3 | 0.13 | 50 |
| 3 | 8 | 3.4 | 2.8 | 0.57 | 1.5 | 30.6 | 0.08 | 50 |
| 4 | 7.1 | 3.3 | 2.7 | 0.59 | 1.1 | 31.2 | 0.04 | 50 |
| 5 | 6.5 | 3.5 | 3.1 | 0.63 | 0.6 | 32.4 | 0.02 | 50 |
| 6 | — | 3.4 | 2.7 | 0.4 | 3.4 | 30.4 | 0.17 | 50 |

Figure 5:
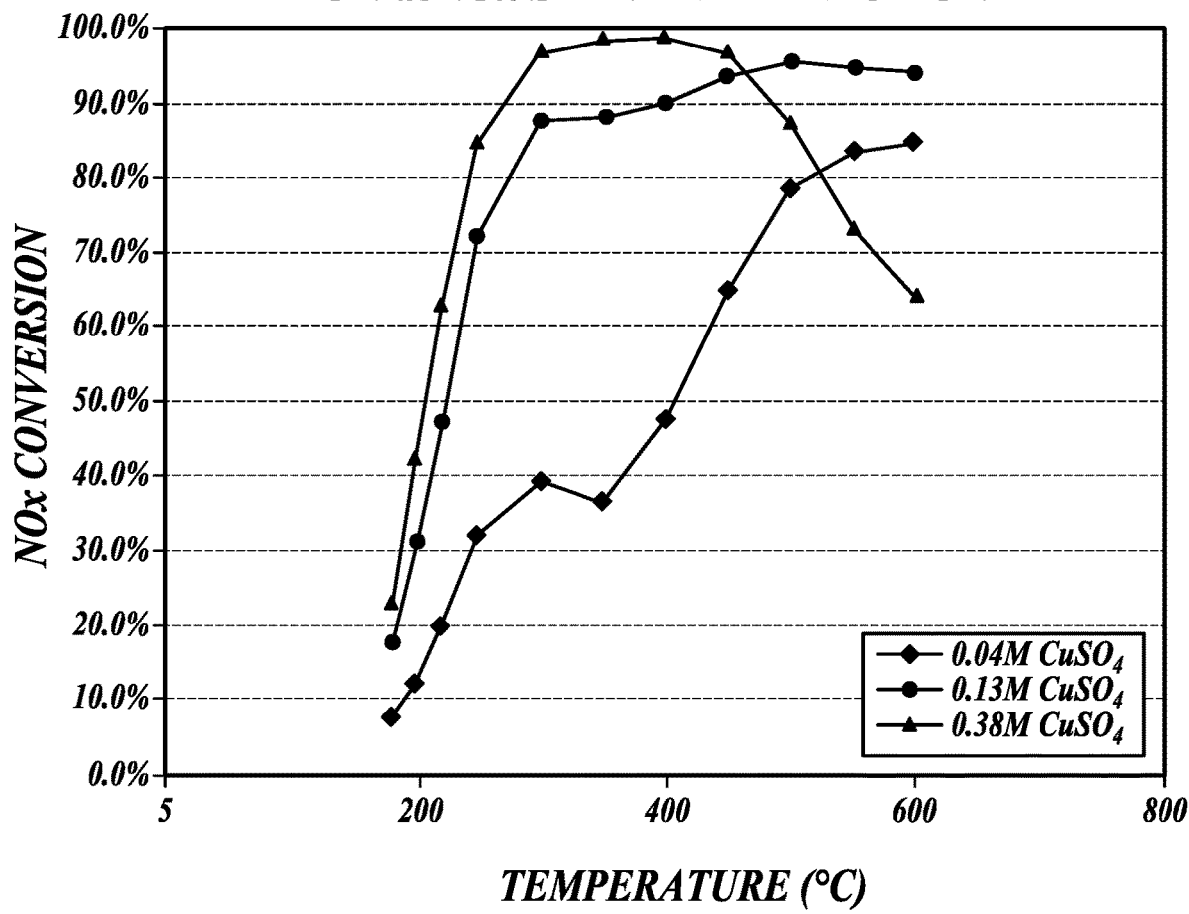
FIG. 5 is a chart showing the effect of copper loading on low temperature $NO_x$ conversion for an embodiment of a binary catalyst composition of the present disclosure.

The results in FIG. 5 illustrate the impact of copper content on the standard $NO_x$ reduction reaction (where there $NO_2$ was not used in the simulated exhaust stream). At low temperatures (e.g., 250° C.), the effect was most pronounced. Therefore, the ability to achieve high loadings of copper without forming CuO in the zeolite is critical for meeting the widely anticipated ultralow $NO_x$ regulations in the heavy-duty diesel truck industry.

Example 3: Post-Synthesis Acid Wash for Copper Content Regulation

One-pot syntheses with the following reagents in the mixture described in Example 1 included:

1a-b) 3.125 g zirconium oxychloride octahydrate, 5 g barium nitrate, 2 g hexammine cobalt (III) chloride, 2 g ferric nitrate nonahydrate and 1 g urea.

2a-b) 3.125 g zirconium oxychloride octahydrate, 5 g barium nitrate, and 1 g urea.

Figure 6A:
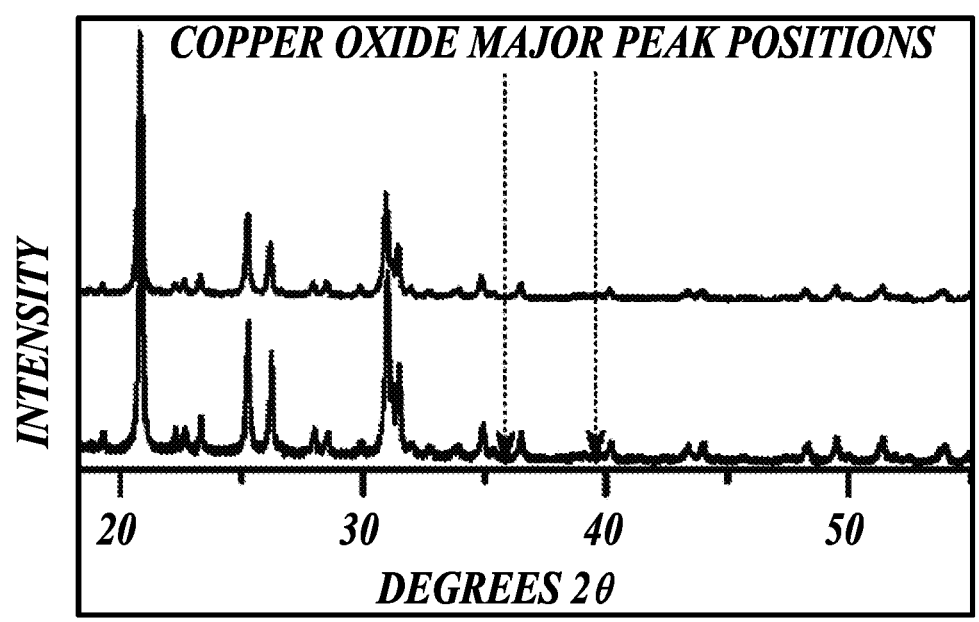
FIG. 6A shows x-ray diffraction patterns to determine the presence of copper oxide in SSZ-13 zeolite in a duplicate control sample of CuSSZ-13.

3) 3.125 g zirconium oxychloride octahydrate, 5 g barium nitrate, 0.8 g ferric nitrate and 1 g urea Table 3, FIG. 6A, and FIG. 6B illustrate the effectiveness of the acid wash step in minimizing CuO formation, as illustrated by samples a and b for first two sets of table in Table 3. The results show that an acid wash during the product recovery stage can dramatically lower the amount of copper not bound to the framework catalytic sites by ionic bonding, thereby removing any extra-framework copper that could potentially form CuO.

TABLE 3

Effect of Post Synthesis Acid Wash on Final Copper Content

| Sample # | Fe | Ba | Al | Zr | Cu | Si | Co | $CuSO_4$ (molar conc) | 28% $NH_3$ solution (mL) | Incubation time (min) | Acid wash |
|---|---|---|---|---|---|---|---|---|---|---|---|
| 1a | — | 7.83 | 3.03 | 2.62 | 4.05 | 28 | 0.1585 | 0.38M | 50 mL | — | — |
| 1b | — | 7.98 | 3.06 | 2.61 | 3.35 | 28.4 | 0.1984 | 0.38M | 50 mL | — | Yes |
| 2a | — | 7.9 | 3.08 | 2.71 | 3.36 | 28.5 | — | 0.38M | 50 mL | 5 | — |
| 2b | — | 7.98 | 3.06 | 2.61 | 3.35 | 27.9 | — | 0.38M | 50 mL | 10 | Yes |
| 3 | 0.3926 | 7.84 | 3.03 | 2.57 | 3.86 | 27.5 | — | 0.38M | 50 mL | 10 | — |

Depicted in FIG. 6A are XRD profiles of a reference sample and synthesized CuSSZ-13 the disclosed procedure, show no evidence of CuO. Likewise, where the commercial (as received) material was compared with samples 1b and 2b from Table 3, no sign of CuO was detected. FIG. 6B is a magnified CuO region in the XRD profile for a SSZ-13 zeolite, a copper-loaded SSZ-13 zeolite, and a hybrid binary catalyst including yttria-stabilized zirconia on extra-crystalline surfaces of the copper-loaded SSZ-13 zeolite, showing no evidence of CuO formation. The hybrid binary catalyst was synthesized using ammonia-facilitated cation loading.

While illustrative embodiments have been illustrated and described, it will be appreciated that various changes can be made therein without departing from the spirit and scope of the disclosure.

A1. A method of making a metal cation-loaded hybrid binary catalyst composition, including:

providing a mixture including a zeolite, a chelating agent, a metal cation precursor, a metal oxide precursor, and a solvent;

adding an aqueous ammonia solution to adjust the pH of the mixture to greater than or equal to 10;

stirring the mixture to provide a crude metal cation-loaded hybrid binary catalyst composition;

isolating the crude metal cation-loaded hybrid binary catalyst composition from the mixture; and calcining the isolated crude metal cation-loaded hybrid binary catalyst composition to provide the metal cation-loaded hybrid binary catalyst composition.

A2. The method of Paragraph A1, further including heating the mixture including the zeolite, the chelating agent, the metal cation precursor, the metal oxide precursor, and the solvent.

A3. The method of Paragraph A1 or Paragraph A2, wherein the zeolite is an aluminosilicate zeolite.

A4. The method of Paragraph A3, wherein the aluminosilicate zeolite is selected from SSZ-13 chabazite, aluminosilicate zeolites having SSZ-type zeolite structures, ZSM-5, and β-zeolite.

A5. The method of any one of Paragraphs A1 to A4, wherein the zeolite is present in the mixture at a concentration of from 10% to 20% zeolite by weight, prior to addition of aqueous ammonia.

A6. The method of any one of Paragraphs A1 to A5, wherein the metal cation precursor is present in the mixture at a concentration of from 0.01 M to 1 M and is selected from copper sulfate, copper nitrate, copper chloride, ferric chloride, ferric nitrate, and any combination thereof.

A7. The method of any one of Paragraphs A1 to A6, wherein the metal oxide precursor is present in the mixture at a concentration of from 0.1 mM to 20 mM.

A8. The method of any one of Paragraphs A1 to A7, wherein the metal oxide precursor is selected from zirconium oxychloride octahydrate, zirconium oxynitrate hydrate, yttrium chloride, barium nitrate, ferric nitrate, hexammine cobalt (III) chloride, hexammine cobalt (III) chloride, and any combination thereof.

A9. The method of any one of Paragraphs A1 to A8, further including washing the isolated crude metal cation-loaded hybrid binary catalyst composition with an aqueous acid selected from aqueous sulfuric acid, nitric acid, hydrochloric acid, lactic acid, citric acid, and any combination thereof, prior to calcining.

A10. The method of any one of Paragraphs A1 to A9, wherein the metal cation-loaded hybrid binary catalyst composition has a metal cation content of from 0.01 wt % to 7 wt %.

A11. A method of making a metal cation-loaded intra-crystalline binary catalyst composition, including:

providing a mixture including an intra-crystalline binary catalyst, a metal cation precursor, and a solvent, wherein the intra-crystalline binary catalyst has a zeolite crystal lattice including a metal oxide covalently bound to elements within the zeolite crystal lattice;

adding an aqueous ammonia solution to adjust the pH of the mixture to greater than or equal to 10;

stirring the mixture to provide a crude metal cation-loaded intra-crystalline binary catalyst composition;

isolating the crude metal cation-loaded intra-crystalline binary catalyst composition from the mixture; and calcining the isolated crude metal cation-loaded intra-crystalline binary catalyst composition to provide the metal cation-loaded intra-crystalline binary catalyst composition.

A12. The method of Paragraph A11, further including heating the mixture including the intra-crystalline binary catalyst, the metal cation precursor, and the solvent.

A13. The method of Paragraph A11 or Paragraph A12, wherein the zeolite is an aluminosilicate zeolite.

A14. The method of Paragraph A13, wherein the aluminosilicate zeolite is selected from SSZ-13 chabazite, aluminosilicate zeolites having SSZ-type zeolite structures, ZSM-5, and β-zeolite.

A15. The method of any one of Paragraphs A11 to A14, wherein the intra-crystalline binary catalyst is present in the mixture at a concentration of 10% to 20% catalyst by weight, prior to addition of aqueous ammonia.

A16. The method of any one of Paragraphs A11 to A15, wherein the metal cation precursor is present in the mixture at a concentration of from 0.01 M to 1 M and is selected from copper sulfate, copper nitrate, copper chloride, ferric chloride, ferric nitrate, and any combination thereof.

A17. The method of any one of Paragraphs A11 to A16, wherein calcining the crude metal cation-loaded intra-crystalline binary catalyst composition includes heating to a temperature of 500° C. or higher and 800° C. or lower.

A18. The method of any one of Paragraphs A11 to A17, further including washing the isolated crude metal cation-loaded intra-crystalline binary catalyst composition with an aqueous acid selected from aqueous sulfuric acid, nitric acid, hydrochloric acid, lactic acid, citric acid, and any combination thereof, prior to calcining.

A19. The method of any one of Paragraphs A11 to A18, wherein isolating the crude metal cation-loaded intra-crystalline binary catalyst composition includes filtering the mixture to provide a solid crude metal cation-loaded intra-crystalline binary catalyst composition and drying the solid crude metal cation-loaded intra-crystalline binary catalyst composition.

A20. The method of any one of Paragraphs A11 to A19, wherein the metal cation-loaded intra-crystalline binary catalyst composition has a metal cation content of from 0.01 wt % to 7 wt %.

The invention claimed is:

1. A method of making a metal cation-loaded hybrid binary catalyst composition, comprising:
providing a mixture comprising an aluminosilicate zeolite selected from SSZ-13 chabazite, other aluminosilicate zeolites having SSZ-type zeolite structures, ZSM-5 and β-zeolite, urea, a metal cation precursor selected from copper sulfate, copper nitrate, copper chloride, ferric chloride, ferric nitrate, tetraaminepalladium nitrate, tetraamineplatinum nitrate, rhodium nitrate hydrate and combinations thereof, a metal oxide precursor selected from $ZrOCl_2 \cdot 8H_2O$, $NaVO_3$, $BaCl_2$, $(NH_4)_6Ce^{4+}(NO_3)_4$, $KMnO_4$, $Co(NO_3)_2$, $Cr(NO_3)_3$, $CaCl_2$, barium nitrate, ammonium molybdate tetrahydrate, calcium nitrate tetrahydrate, nickel nitrate, titanium chloride, tungsten chloride, zirconium oxynitrate hydrate, yttrium chloride, ferric nitrate, hexammine cobalt (III) chloride and combinations thereof and a solvent;
adding an aqueous ammonia solution to adjust the pH of the mixture to greater than or equal to 10;
stirring the mixture to provide a crude metal cation-loaded hybrid binary catalyst composition;
isolating the crude metal cation-loaded hybrid binary catalyst composition from the mixture; and
calcining the isolated crude metal cation-loaded hybrid binary catalyst composition to provide the metal cation-loaded hybrid binary catalyst composition.

2. The method of claim 1, further comprising heating the mixture comprising the zeolite, the urea, the metal cation precursor, the metal oxide precursor, and the solvent.

3. The method of claim 1, wherein the aluminosilicate zeolite is present in the mixture at a concentration of from 10% to 20% aluminosilicate zeolite by weight, prior to addition of the aqueous ammonia solution.

4. The method of claim 1, wherein the metal cation precursor is present in the mixture at a concentration of from 0.01 M to 1 M.

5. The method of claim 1, wherein the metal oxide precursor is present in the mixture at a concentration of from 0.1 mM to 20 mM.

6. The method of claim 1, wherein the metal oxide precursor is selected from zirconium oxychloride octahydrate, zirconium oxynitrate hydrate, yttrium chloride, barium nitrate, ferric nitrate, hexammine cobalt (III) chloride, and any combination thereof.

7. The method of claim 1, further comprising washing the isolated crude metal cation-loaded hybrid binary catalyst composition with an aqueous acid selected from aqueous sulfuric acid, nitric acid, hydrochloric acid, lactic acid, citric acid, and any combination thereof, prior to calcining.

8. The method of claim 1, wherein the metal cation-loaded hybrid binary catalyst composition has a metal cation content of from 0.01 wt % to 7 wt %.

9. The method of claim 2, wherein the mixture is heated to 40° C. or more.

10. The method of claim 2, wherein the mixture is heated to 90° C. or less.

11. The method of claim 2, wherein the solvent is an aqueous solvent.

12. The method of claim 2, wherein the aqueous ammonia solution has a concentration of 28 wt % and is added to the mixture over a period of 3 seconds or more and less than 5 minutes.

13. The method of claim 1, wherein the metal cation precursor is selected from copper sulfate, copper nitrate, copper chloride, ferric chloride, ferric nitrate, and any combination thereof.

* * * * *